US011290888B2

(12) United States Patent
Lee et al.

(10) Patent No.: US 11,290,888 B2
(45) Date of Patent: Mar. 29, 2022

(54) ELECTRONIC DEVICE FOR DISCOVERING DEVICE AND METHOD THEREOF

(71) Applicant: Samsung Electronics Co., Ltd., Suwon-si (KR)

(72) Inventors: Sangyoun Lee, Suwon-si (KR); Haewook Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 16/877,848

(22) Filed: May 19, 2020

(65) Prior Publication Data

US 2020/0382951 A1 Dec. 3, 2020

(30) Foreign Application Priority Data

May 29, 2019 (KR) .................. 10-2019-0063425

(51) Int. Cl.
*H04W 4/00* (2018.01)
*H04W 12/50* (2021.01)
(Continued)

(52) U.S. Cl.
CPC ............. *H04W 12/50* (2021.01); *H04W 4/80* (2018.02); *H04W 8/26* (2013.01); *H04W 12/037* (2021.01); *H04W 12/47* (2021.01); *H04W 76/14* (2018.02)

(58) Field of Classification Search
CPC ... H04W 76/14; H04W 12/037; H04W 12/47; H04W 8/26; H04W 12/003;
(Continued)

(56) References Cited

U.S. PATENT DOCUMENTS 9,054,961 B1 * 6/2015 Kim ...................... H04L 67/141
10,158,905 B2 * 12/2018 Lau ..................... H04N 21/4126
(Continued)

FOREIGN PATENT DOCUMENTS

| EP | 2 884 776 A2 | 6/2015 |
| EP | 3 073 704 A1 | 9/2016 |
| WO | 2018/118822 A1 | 6/2018 |

OTHER PUBLICATIONS

International Search Report dated Aug. 28, 2020, issued in International Application No. PCT/KR2020/006530.
(Continued)

*Primary Examiner* — Marceau Milord
(74) *Attorney, Agent, or Firm* — Jefferson IP Law, LLP

(57) ABSTRACT

An electronic device is provided. The electronic device includes a wireless communication circuit configured to transmit or receive at least one radio frequency (RF) signal, at least one processor, and a memory. The memory includes instructions that, when executed, enable the at least one processor to generate a first random address of the electronic device, transmit a first advertising packet including the first random address, receive a scan request corresponding to the first advertising packet from an external electronic device, generate a first encrypted random address resulting from encrypting the first random address and a second encrypted random address resulting from encrypting the second random address corresponding to reception of the scan request, transmit a scan response including the first encrypted random address and the second encrypted random address to the external electronic device, and transmit a second advertising packet including the second random address.

23 Claims, 17 Drawing Sheets

(51) Int. Cl.
*H04W 76/14* (2018.01)
*H04W 8/26* (2009.01)
*H04W 4/80* (2018.01)
*H04W 12/037* (2021.01)
*H04W 12/47* (2021.01)

(58) Field of Classification Search
CPC ............... H04W 12/0017; H04W 4/80; H04W 12/00407; H04W 12/00; H04W 12/041; H04W 8/005; H04W 4/027
USPC .......................................................... 370/329
See application file for complete search history.

(56) References Cited

U.S. PATENT DOCUMENTS

| | | | | |
|---|---|---|---|---|
| 10,734,705 | B2 * | 8/2020 | Choi | H05K 5/03 |
| 2004/0088369 | A1 * | 5/2004 | Yeager | H04L 67/04 |
| | | | | 709/217 |
| 2004/0133640 | A1 * | 7/2004 | Yeager | H04L 63/0428 |
| | | | | 709/204 |
| 2011/0085447 | A1 * | 4/2011 | Kholaif | H04W 12/069 |
| | | | | 370/242 |
| 2012/0063598 | A1 * | 3/2012 | Huh | H04L 63/061 |
| | | | | 380/270 |
| 2012/0096513 | A1 * | 4/2012 | Raleigh | H04W 8/18 |
| | | | | 726/1 |
| 2013/0036231 | A1 * | 2/2013 | Suumaki | H04W 12/04 |
| | | | | 709/228 |
| 2013/0283351 | A1 * | 10/2013 | Palin | H04W 4/48 |
| | | | | 726/4 |
| 2014/0068719 | A1 * | 3/2014 | Kiukkonen | H04W 12/50 |
| | | | | 726/4 |
| 2014/0075523 | A1 * | 3/2014 | Tuomaala | H04L 63/083 |
| | | | | 726/6 |
| 2014/0195654 | A1 * | 7/2014 | Kiukkonen | H04W 8/00 |
| | | | | 709/220 |
| 2015/0067819 | A1 * | 3/2015 | Shribman | H04L 65/4084 |
| | | | | 726/12 |
| 2015/0356289 | A1 * | 12/2015 | Brown | H04L 63/0884 |
| | | | | 726/7 |
| 2016/0007181 | A1 * | 1/2016 | Palin | H04B 17/10 |
| | | | | 455/41.2 |
| 2016/0029384 | A1 * | 1/2016 | Sidhu | H04W 72/0453 |
| | | | | 370/329 |
| 2016/0227162 | A1 * | 8/2016 | Bargetzi | G06F 3/04842 |
| 2017/0026778 | A1 * | 1/2017 | Yamada | H04W 4/80 |
| 2017/0161978 | A1 * | 6/2017 | Wishne | G07C 9/21 |
| 2017/0201931 | A1 * | 7/2017 | Swanzey | H04W 76/10 |
| 2017/0272405 | A1 * | 9/2017 | Kerai | H04W 12/06 |
| 2018/0077124 | A1 * | 3/2018 | Ramoutar | H04L 63/067 |
| 2018/0091957 | A1 | 3/2018 | Kumar | |
| 2019/0098494 | A1 * | 3/2019 | Pry | H04W 4/80 |
| 2019/0159022 | A1 | 5/2019 | Skillermark et al. | |
| 2019/0313246 | A1 * | 10/2019 | Nix | H04L 9/3263 |
| 2019/0361694 | A1 * | 11/2019 | Gordon | G06F 1/1673 |

OTHER PUBLICATIONS

European Search Report dated Dec. 2, 2021, issued in European Application No. 20813835.4.

* cited by examiner

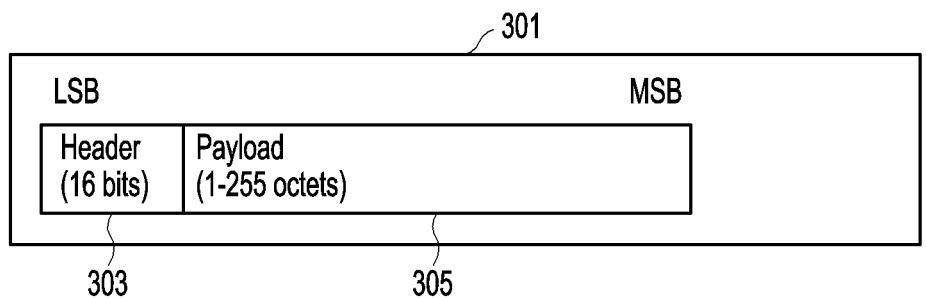
FIG.3A
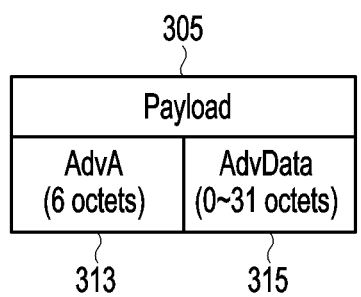
FIG.3B
| Value | Notes |
|---|---|
| 0x02 | Length of this data |
| 0x01 | <<Flags>> |
| 0x1A | 0b00011010 (General Discoverable Mode, Simultaneous LE and BR/EDR) |
| 0x19 | Length of this data |
| 0x26 | <<Transport Discovery Data>> |
| 0x02 | Organization ID (UWB Forum) |
| 0x01 | TDS flags (seeker role) |
| 0x15 | Transport Data Length |
FIG.3C

| 0x00 | Response Data (Random Number Encrypted by rK1: 3bytes) |
| --- | --- |
| 0xAF | |
| 0x04 | |
| 0xD8 | Response Data (Random Number Encrypted by rK2: 3bytes) |
| | …… |
| | …… |
| | …… |
| | …… |
| | …… |
| | …… |
| | …… |
| 0x10 | Response Data (Random Number Encrypted by rK10: 3bytes) |
| 0x13 | |
| 0xDA | |

| Index   | Value | Note          |
|---------|-------|---------------|
| 1 byte  | 0x0A  | User data     |
| 2 byte  | 0xAB  | User data     |
| 3 byte  | 0x0C  | User data     |
| 4 byte  | 0xBB  | User data     |
| ...     | ...   | ...           |
| ...     | ...   | ...           |
| 27 byte | ...   | User data     |
| 28 byte | 0xCB  | User data     |
| 29 byte | 0xAA  | Random Number |
| 30 byte | 0x58  | Random Number |
| 31 byte | 0xCB  | Random Number |

FIG.14

ELECTRONIC DEVICE FOR DISCOVERING DEVICE AND METHOD THEREOF

CROSS-REFERENCE TO RELATED APPLICATION(S)

This application is based on and claims priority under 35 U.S.C. § 119(a) of a Korean patent application number 10-2019-0063425, filed on May 29, 2019, in the Korean Intellectual Property Office, the disclosure of which is incorporated by reference herein in its entirety.

BACKGROUND

1. Field

The disclosure relates to an electronic device and method of discovering a device.

2. Description of Related Art

Bluetooth is a short-range wireless standard technology in which electronic devices connect together and exchange information. Bluetooth enables transmission and reception of data without any physical communication cable between electronic devices. Establishing a Bluetooth connection between one electronic device and another is a prerequisite for the two devices to perform data transmission or reception using Bluetooth.

Establishing a Bluetooth connection requires discovery, by an electronic device (e.g., a master device), of another electronic device (e.g., a slave device) and a connection attempt by the master electronic device. For example, the master device broadcasts advertising packets, and the slave device performs scanning and sends a request for connection to the master device (e.g., in response to receiving the advertising packets).

If the master and slave devices both are authenticated there between, the master device may include reliable (e.g., encrypted) data in the advertising packets or the slave device may transmit reliable data in performing scanning so as to identify the authentication of the respective devices.

However, if a malicious user device copies the advertising packet from the master device and retransmits the result while the master and slave devices perform the operations for Bluetooth connection (e.g., man in the middle attack (MITM)), the slave device may not be able to determine whether the malicious user device is an authenticated device based only on the advertising packet. Or, if a malicious user device copies the scan request packet from the slave device and retransmits the result while the master and slave devices perform the operations for Bluetooth connection, the master device may not be able to determine whether the malicious user device is an authenticated device based only on the scan request packet.

As such, the malicious user device simply copies and retransmits data although it is not an authenticated device, thus breaking the reliability between the master and slave devices. Further, the malicious user device may cause depletion of radio frequency resources and hence restriction on connection between authenticated devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or advantages and to provide at least the advantages described below. Accordingly, an aspect of the disclosure is to provide an electronic device and method that may generate a random number upon performing operations for a Bluetooth connection and determining whether a connecting device is an authenticated device using the generated random number and an authentication key.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit configured to transmit or receive at least one radio frequency (RF) signal, at least one processor operatively connected with the wireless communication circuit, and a memory operatively connected with the at least one processor, wherein the memory includes instructions that, when executed, enable the at least one processor to generate a first random address of the electronic device, transmit a first advertising packet including the first random address via the wireless communication circuit, receive a scan request corresponding to the first advertising packet via the wireless communication circuit from an external electronic device, generate a first encrypted random address resulting from encrypting the first random address and a second encrypted random address resulting from encrypting the second random address, corresponding to reception of the scan request, transmit a scan response including the first encrypted random address and the second encrypted random address to the external electronic device via the wireless communication circuit, and transmit a second advertising packet including the second random address via the wireless communication circuit.

In accordance with another aspect of the disclosure, an electronic device is provided. The electronic device includes a wireless communication circuit configured to transmit or receive at least one radio frequency (RF) signal, at least one processor operatively connected with the wireless communication circuit, and a memory operatively connected with the at least one processor, wherein the memory includes instructions that, when executed, enable the at least one processor to generate a first random address of the electronic device, transmit a first advertising packet via the wireless communication circuit, receive a scan request corresponding to a first random address corresponding to the electronic device via the wireless communication circuit from an external electronic device, generate a first encrypted random address resulting from encrypting the first random address, corresponding to reception of the scan request, transmit a scan response including the first encrypted random address to the external electronic device via the wireless communication circuit, and receive a connection request from the external electronic device via the wireless communication circuit.

In accordance with another aspect of the disclosure, an electronic device is provided. The electronic device includes a wireless communication circuit configured to transmit or receive at least one radio frequency (RF) signal, at least one processor operatively connected with the wireless communication circuit, and a memory operatively connected with the at least one processor, wherein the memory includes instructions that, when executed, enable the at least one processor to generate first random advertising data based on a random number, transmit a first advertising packet including the first random advertising data via the wireless communication circuit, receive a connection request including an initiator address corresponding to the first advertising packet from an external electronic device from the wireless communication circuit, identify whether the external electronic device is authenticated based on the first random advertising data included in the connection request, and when the external electronic device is identified as an authenticated device, generate a connection with the external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which:

FIGS. 3A, 3B, and 3C illustrate advertising packets according to various embodiments of the disclosure;

FIG. 14 illustrates an advertising data packet according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
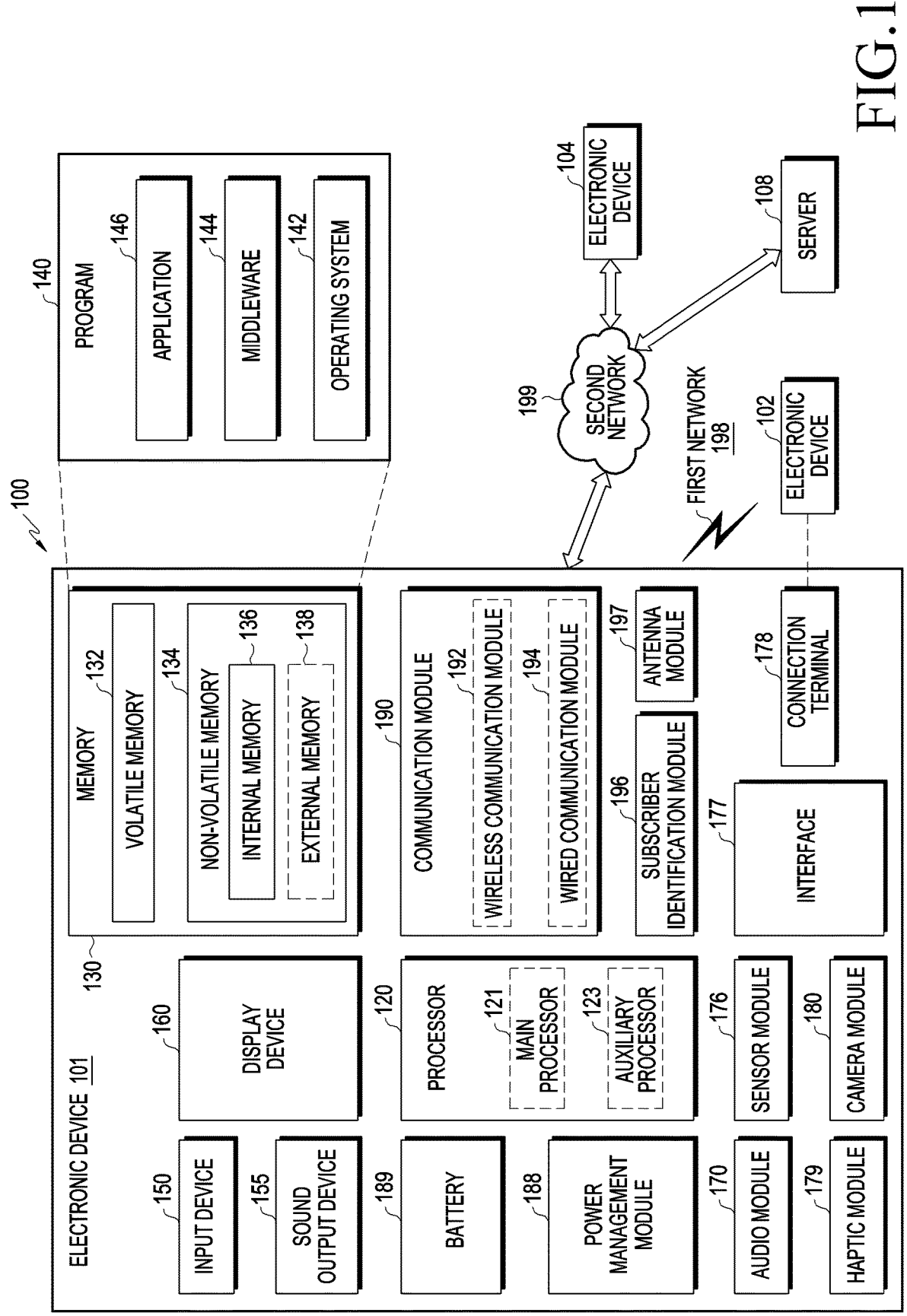
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone)) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
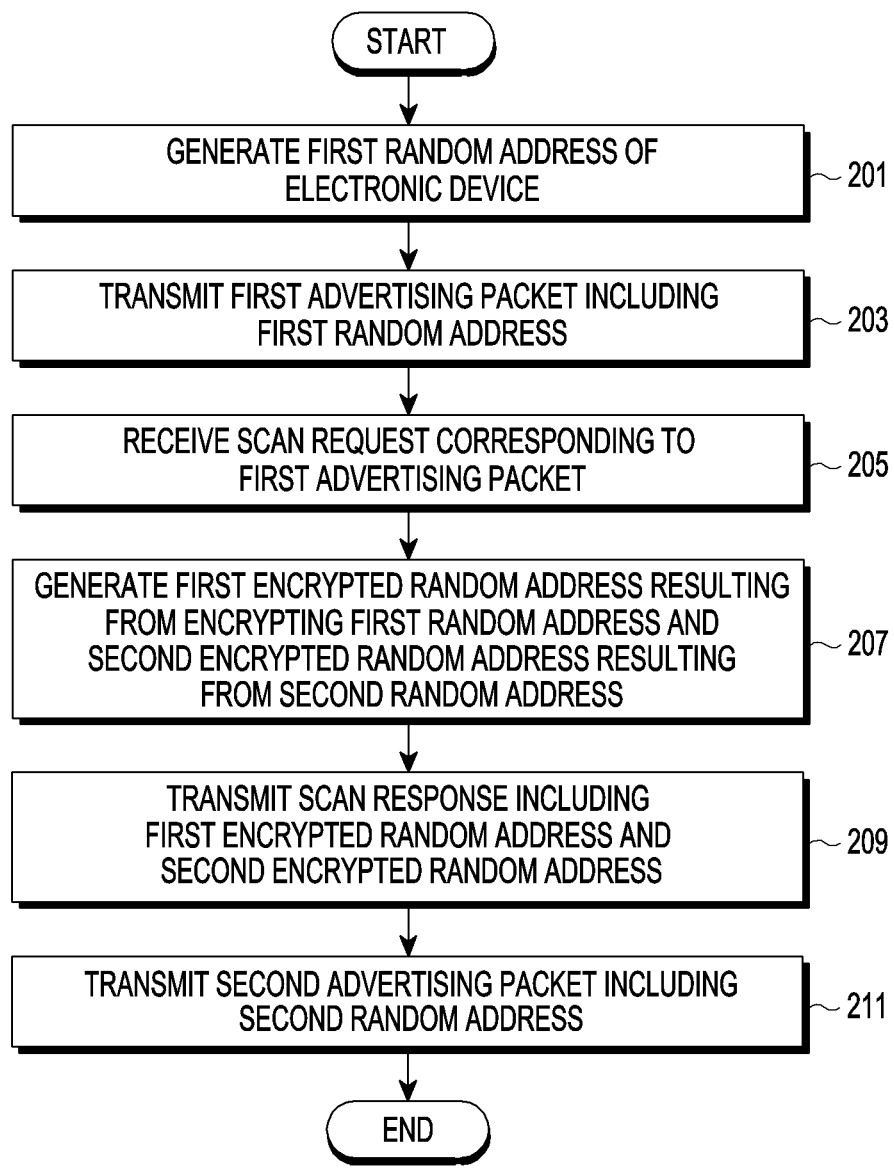
FIG. 2 is a flowchart illustrating a discovery method according to an embodiment of the disclosure.

FIG. 2 is a flowchart illustrating a discovery method according to an embodiment of the disclosure.

The embodiment of FIG. 2 is described in greater detail with reference to FIGS. 3A, 3B, 4A, and 4B.

FIGS. 3A, 3B, 3C illustrate advertising packets according to various embodiments of the disclosure.

Figures 4A, 4B:
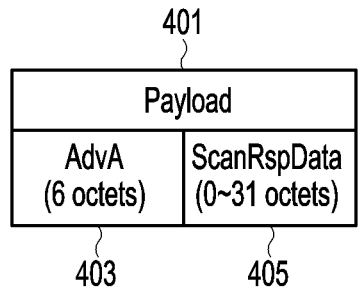
FIGS. 4A and 4B illustrate scan response packets according to various embodiments of the disclosure.

FIGS. 4A and 4B illustrate scan response packets according to various embodiments of the disclosure.

According to an embodiment, an electronic device 101 (e.g., the processor 120) may generate a first random address (e.g., AdvA1 313) of the electronic device 101 in operation 201. For example, random address may mean that among the values indicating the address of the electronic device 101, at least some are random values. For example, the electronic device 101 may generate a random address indicating the address (AdvA) of the electronic device whenever transmitting an advertising packet. For example, the electronic device 101 may form or generate a random number, such as a one-time password (OTP), and represent the random number in the format of an advertising address to thereby generate a random address.

Figure 6:
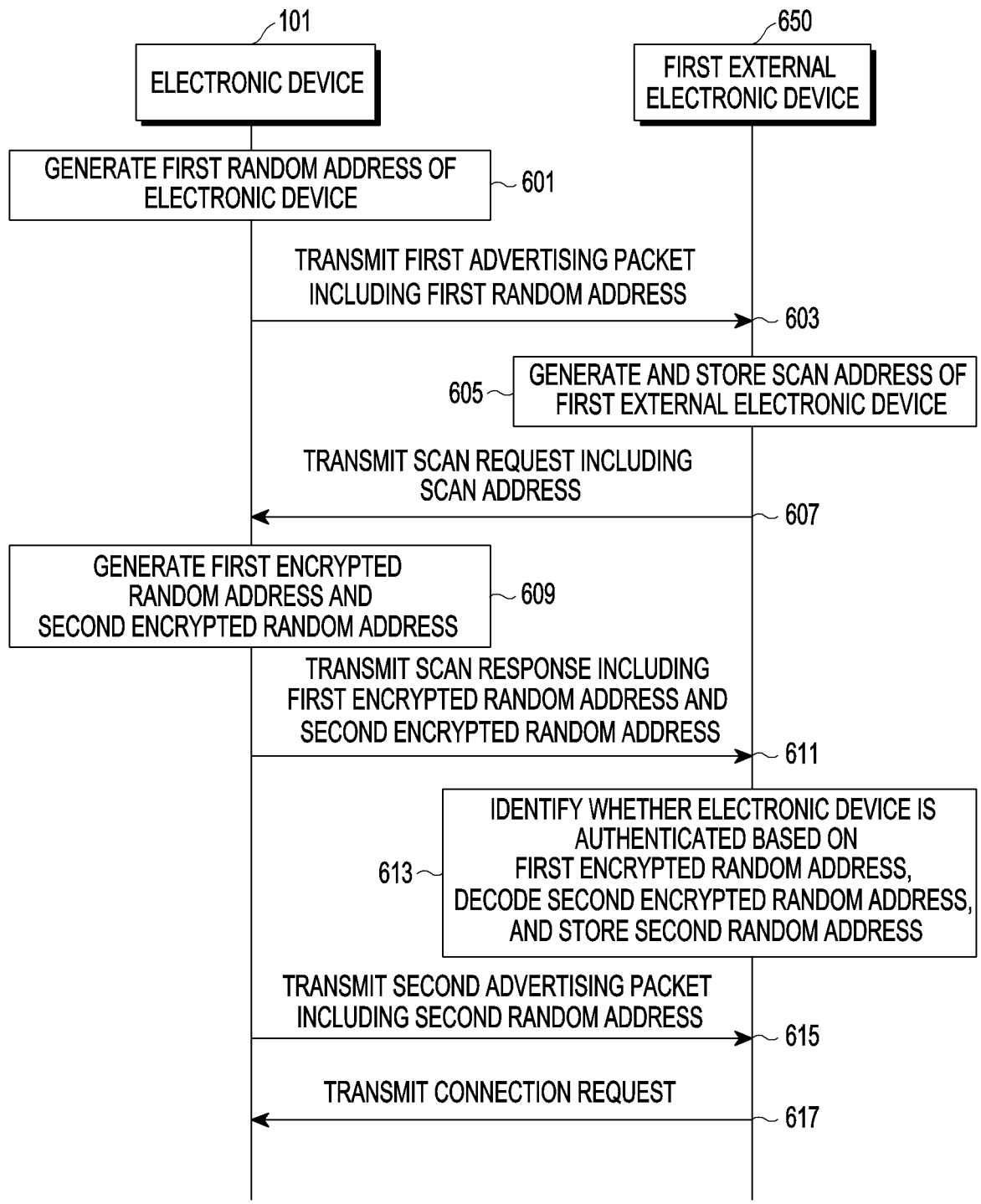
FIG. 6 is a flowchart illustrating a discovery method according to an embodiment of the disclosure.

According to an embodiment, the electronic device 101 may transmit a first advertising packet including the first random address (AdvA1 313) in operation 203. For example, the electronic device 101 may generate a first advertising packet including the first random address (AdvA1 313) and advertising data (AdvData 315) and transmit (or broadcast) the first advertising packet to a first external electronic device (e.g., the electronic device 102). For example, as shown in FIG. 3A, the advertising packet 301 may include a header 303 which is 16 bit long and a payload 305 of 1-255 octets. For example, as shown in FIG. 3B, 6 octets of the payload 305 may be allocated to represent the address AdvA 313 of the electronic device 101, and 0-31 octets of the payload 305 may be allocated to represent the advertising data AdvData 315. The electronic device 101 may generate a random address as per the standards (e.g., Bluetooth core specification v5.0). The 6 octets representing the address of the electronic device 101 may be the first random address (AdvA1 313). The advertising data (AdvData 315) may include a service unique identifier (service UUID), service data, and/or flag information as shown in FIG. 3C.

Referring back to FIG. 2, according to an embodiment, the electronic device 101 may receive a scan request corresponding to the first advertising packet from the external electronic device in operation 205. For example, the electronic device 101 may receive a scan request including the address (ScanA) of the external electronic device from the external electronic device.

According to an embodiment, the electronic device 101 may generate a first encrypted random address resulting from encrypting the first random address (AdvA1) and a second encrypted random address resulting from encrypting the second random address (AdvA2) in operation 207. According to an embodiment, the electronic device 101 may store a shared key which is previously shared with the first external electronic device and may encrypt the first random address using the shared key. For example, the shared key may be shared between the electronic device 101 and the first external electronic device via a short-range communication network (e.g., the first network 198) or a remote communication network (e.g., the second network 199). The electronic device 101 and the first external electronic device may share the shared key by a reliable method. The short-range wireless communication is an example method for sharing the shared key between the electronic device 101 and the first external electronic device and does not limit the spirit of the disclosure. As another example, the electronic device 101 and the first external electronic device may share the shared key via a server (e.g., the server 108). According to an embodiment, if the first random address (AdvA1) is 6 octets long as shown in FIG. 3B, the electronic device 101 may encrypt the whole 6-octet first random address (AdvA1) to thereby generate the first encrypted random address or may encrypt some (e.g., 3 octets) of the 6 octets of the first random address (AdvA1) to thereby generate the first encrypted random address. The electronic device 101 may generate the second random address (AdvA2) in the same manner that it has generated the first random address (AdvA1) and encrypt the second random address to thereby generate the second encrypted random address. The electronic device 101 may manage the first random address (AdvA1) as valid until the time when a second advertising packet including the second random address (AdvA2) is transmitted.

Referring back to FIG. 2, according to an embodiment, the electronic device 101 may transmit a scan response including the first encrypted random address and the second random address (AdvA2) to the external electronic device in operation 209. For example, as shown in FIG. 4A, the electronic device 101 may allocate 6 octets of the payload 401 of the scan response to represent the address (AdvA) 403 of the electronic device 101 and allocate 0-31 octets of the payload 401 of the scan response to represent scan response data (ScanRspData) 405. For example, the address 403 of the electronic device 101 may be the first random address (AdvA1) of the electronic device 101 transmitting the advertising packet, and the scan response data 405 may include the first encrypted random address. For example, if the electronic device 101 encrypts only 3 octets of the 6-octet first random address (AdvA1), the scan response data 405 may be as shown in FIG. 4B.

Referring back to FIG. 2, according to an embodiment, the electronic device 101 may transmit (or broadcast) a second advertising packet including the second random address (AdvA2) in operation 211. Since the second encrypted random address resulting from encrypting the second random address (AdvA2) has been transmitted in the scan response to the external electronic device in operation 209, the external electronic device may previously be aware of the second random address decoded from the second encrypted random address. Thus, the electronic device 101 and the external electronic device may form a Bluetooth connection using the second random address.

Figure 5:
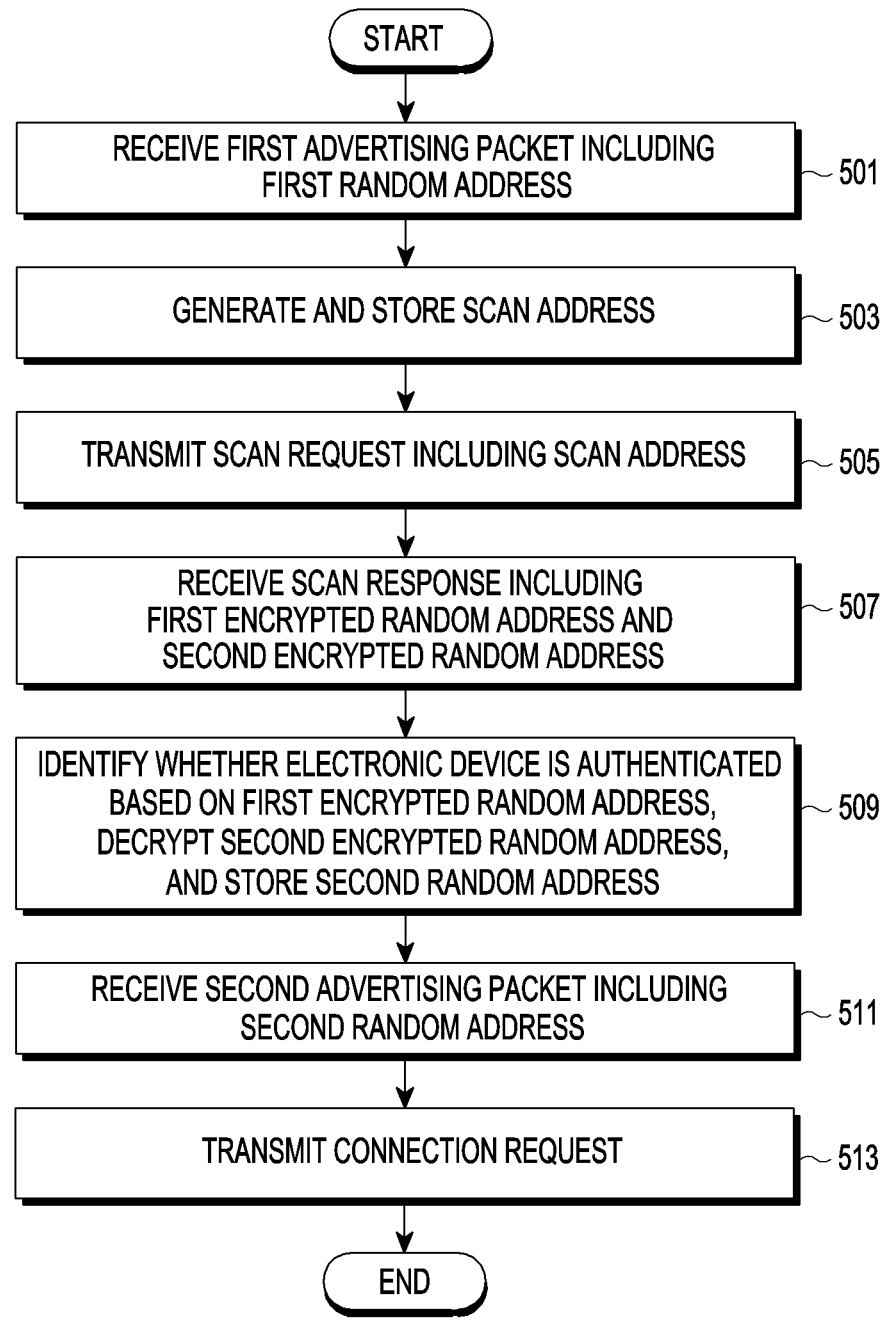
FIG. 5 is a flowchart illustrating a discovery method according to an embodiment of the disclosure.

FIG. 5 is a flowchart illustrating a discovery method according to an embodiment of the disclosure.

According to an embodiment, a first electronic device (e.g., the electronic device 102) may receive a first advertising packet including a first random address associated with a second electronic device (e.g., the electronic device 101) in operation 501. For example, the first external electronic device may receive the first advertising packet including the first random address in which at least part of the address of the electronic device 101 transmitting the first advertising packet includes random numbers. The first advertising packet may further include advertising data.

According to an embodiment, the first external electronic device may generate and store a scan address in operation 503. For example, the first external electronic device may determine whether to establish a Bluetooth connection with the electronic device 101 based on the advertising data included in the first advertising packet. Upon determining to establish a Bluetooth connection with the electronic device 101, the first external electronic device may generate and store a scan address (ScanA) which is the address of the first external electronic device. The scan address (ScanA) may be valid from when the scan address (ScanA) is generated until the time when a Bluetooth connection with the electronic device 101 is established.

According to an embodiment, the first external electronic device may transmit a scan request including the scan address (ScanA) to the electronic device 101 in operation 505. The first external electronic device may send a request for additional information necessary to establish a Bluetooth connection to the electronic device 101 by transmitting a scan request including the scan address (ScanA) to the electronic device 101 which has transmitted the first advertising packet. Since the scan address (ScanA) is valid from the time it is generated until the time when a Bluetooth connection is established, if the second advertising packet is received before a Bluetooth connection is established, the first external electronic device may transmit a scan request including the same scan address (ScanA) as the scan address (ScanA) generated in operation 503 to the electronic device 101 which has transmitted the second advertising packet.

According to an embodiment, the first external electronic device may receive a scan response including a first encrypted random address and a second encrypted random address from the electronic device 101 in operation 507. The first encrypted random address may be a value resulting from encrypting the first random address in the electronic device 101 having transmitted the first advertising packet, and the second encrypted random address may be a value resulting from encrypting the second random address (AdvA2).

According to an embodiment, the first external electronic device may identify whether the electronic device 101 is authenticated based on the first encrypted random address, decode the second encrypted random address, and store the second random address in operation 509. The first external electronic device may store a shared key which has previously been shared with the electronic device 101 having transmitted the first advertising packet and compare the first random address before the first encrypted random address is encrypted with the first random address included in the first advertising packet using the shared key. The first external electronic device may compare the result of encrypting the first random address (AdvA1) using the shared key with the first encrypted random address included in the scan response. When the result of encrypting the first random address (AdvA1) using the shared key matches the first encrypted random address included in the scan response, the first external electronic device may determine that the electronic device 101 is an authenticated device. When the electronic device 101 is identified to be an authenticated device, the first external electronic device may decode the second encrypted random address and store the second random address in the memory to establish a Bluetooth connection in a subsequent operation. The first external electronic device may decode the first encrypted random address included in the scan response and compare the same with the first random address received in operation 501. When the result of decoding the first encrypted random address included in the scan response matches the first random address received in operation 501, the first external electronic device may determine that the electronic device 101 is an authenticated device.

According to an embodiment, the first external electronic device may receive the second advertising packet including the second random address from the electronic device 101 in operation 511. The second random address included in the second advertising packet may be identical to the second random address stored in operation 509.

According to an embodiment, the first external electronic device may transmit a connection request to the electronic device 101 in operation 513. Since the electronic device 101 has been determined to be an authenticated device in operation 509, the first external electronic device may transmit a connection request to the electronic device 101, which has transmitted the second advertising packet, without performing any separate authentication process (i.e., without receiving a scan response after transmitting a scan request).

FIG. 6 is a flowchart illustrating a discovery method according to an embodiment of the disclosure. According to an embodiment, FIG. 6 assumes that an electronic device 101 and a first external electronic device 650 store a shared key previously shared therebetween.

According to an embodiment, an electronic device 101 (e.g., the processor 120) may generate a first random address (e.g., AdvA1) of the electronic device 101 in operation 601. The electronic device 101 may generate a random address indicating the address (AdvA) of the electronic device whenever transmitting an advertising packet. For example, the electronic device 101 may form a random number, such as a one-time password (OTP), and represent the random number in the format of an advertising address to thereby generate a random address.

According to an embodiment, the electronic device 101 may transmit a first advertising packet including the first random address (AdvA1) to the first external electronic device 650 (e.g., the electronic device 102) in operation 603. The first advertising packet may further include advertising data indicating a service unique identifier.

According to an embodiment, the first external electronic device 650 may generate and store the scan address (ScanA) of the first external electronic device 650 in operation 605. For example, the first external electronic device 650 may determine whether to establish a Bluetooth connection with the electronic device 101 based on the advertising data included in the first advertising packet. Upon determining to establish a Bluetooth connection with the electronic device 101, the first external electronic device 650 may generate and store a scan address (ScanA) which is the address of the first external electronic device 650.

According to an embodiment, the first external electronic device 650 may transmit a scan request including the scan address (ScanA) to the electronic device 101 in operation 607. For example, the scan request may further include the first random address (AdvA1) included in the first advertising packet.

According to an embodiment, the electronic device 101 may generate a first encrypted random address and a second encrypted random address in operation 609. The first encrypted random address may result from encrypting the first random address (AdvA1) and the second encrypted random address may result from encrypting the second random address (AdvA2). The electronic device 101 may generate the second random address in the same manner as it has generated the first random address. For example, the electronic device 101 may generate the first encrypted random address by encrypting the first random address (AdvA1) using the shared key previously shared with the first external electronic device 650 and generate the second encrypted random address by encrypting the second random address (AdvA2) using the same shared key.

According to an embodiment, the electronic device 101 may transmit a scan response including the first encrypted random address and the second encrypted random address to the first external electronic device 650 in operation 611. For example, the payload of the scan response may include the first random address and scan response data, and the scan response data may include the first encrypted random address and the second encrypted random address.

According to an embodiment, the first external electronic device 650 may identify whether the electronic device 101 is authenticated based on the first encrypted random address, decode the second encrypted random address, and store the second random address (AdvA2) in operation 613. The first external electronic device 650 may compare the resulting first random address (AdvA1) encrypted using the shared key previously shared with the electronic device 101 having transmitted the first advertising packet with the first encrypted random address included in the scan response. When the encrypted first random address (AdvA1) matches the first encrypted random address included in the scan response, the first external electronic device 650 may determine that the electronic device 101 is an authenticated device. Or, the first external electronic device may decode the first encrypted random address using the shared key and identify whether the first random address generated by decoding the first encrypted random address matches the first random address included in the first advertising packet. If the identified first random address matches the first random address included in the first advertising packet, the first external electronic device may determine that the electronic device 101 is an authenticated device. Upon determining that the electronic device 101 is an authenticated device, the first external electronic device may decode the second encrypted random address and store the second random address to establish a Bluetooth connection in a subsequent operation.

According to an embodiment, the electronic device 101 may transmit a second advertising packet including the second random address (AdvA2) to the first external electronic device 650 in operation 615.

According to an embodiment, the first external electronic device 650 may transmit a connection request to the electronic device 101 in operation 617. For example, when it is determined that the second random address (AdvA2) included in the second advertising packet received from the electronic device 101 is identical to the second random address (AdvA2) stored in operation 613, the first external electronic device 650 may determine that the electronic device 101 is an authenticated device in operation 613. Thus, upon receiving the second advertising packet including the second random address (AdvA2) from the electronic device 101, the first external electronic device 650 may transmit a connection request to the electronic device 101 without performing a separate authentication process. Thus, the first external electronic device 650 may determine (e.g., indirectly) whether the electronic device 101 is an authenticated device (e.g., based on information included in an advertising packet) and, only when the first external electronic device 650 determines that the electronic device 101 is an authenticated device does the first external electronic device 650 initiate establishing a Bluetooth connection with the electronic device 101.

Figure 7:
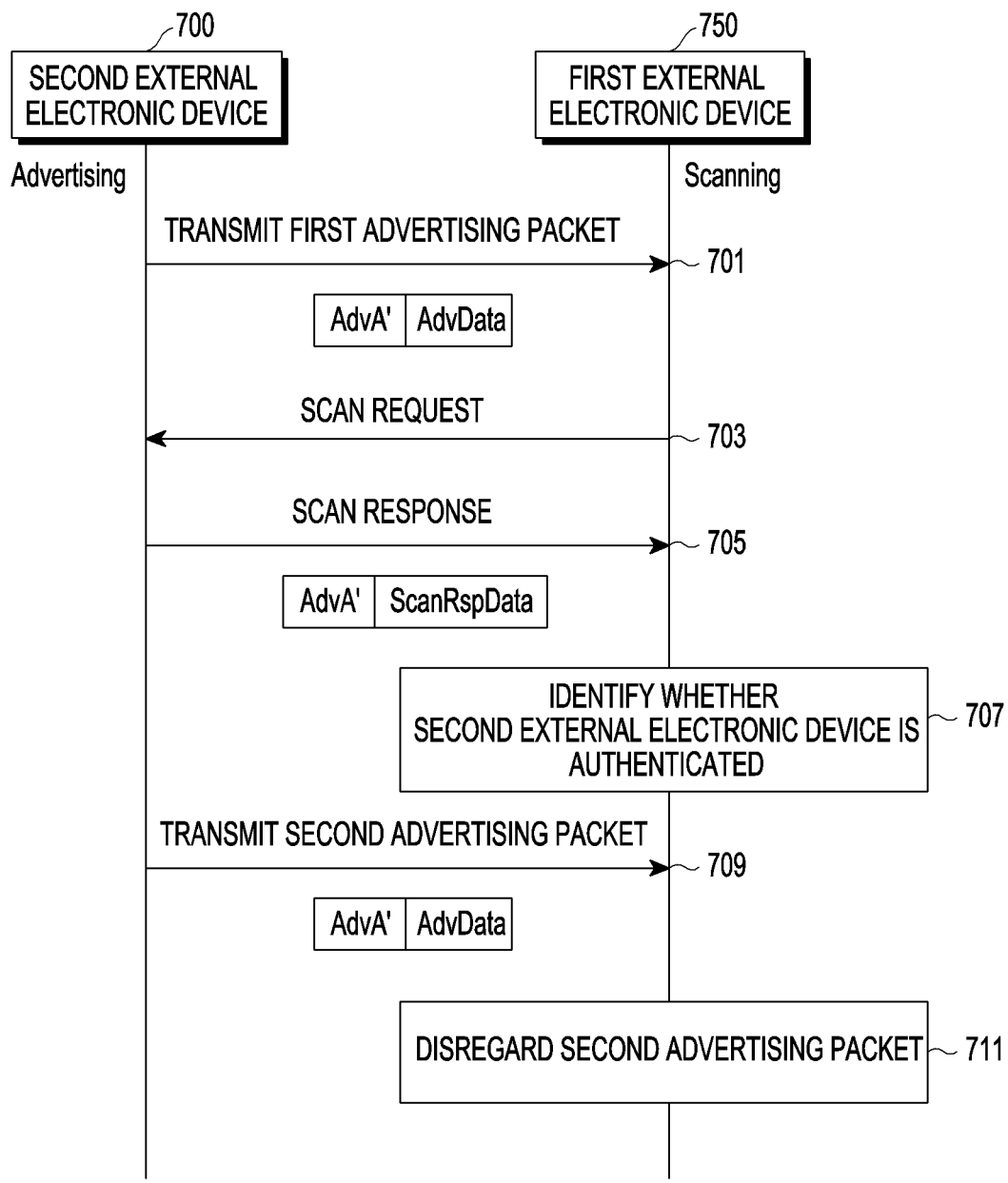
FIG. 7 is a flowchart illustrating a discovery method according to an embodiment of the disclosure.

FIG. 7 is a flowchart illustrating a discovery method according to an embodiment of the disclosure. According to an embodiment, FIG. 7 assumes that a shared key was not previously shared or stored between a second external electronic device 700 and a first external electronic device 750. The second external electronic device 700 of FIG. 7 may be a malicious user device that copies and retransmits the data stream of the electronic device 101 (e.g., a device carrying out a man in the middle (MITM) attack).

According to an embodiment, the second external electronic device 700 may transmit the first advertising packet (e.g., a copy of the advertising packet transmitted from the electronic device 101) to the first external electronic device 750 in operation 701. In the case of a MITM attack, the first advertising packet may include the address of the device directly transmitting the advertising packet and the advertising data. That is, second external electronic device 700 may modify the advertising packet originally transmitted from the electronic device 101 such that the address associated with the electronic device 101 is replaced with the address of the second external electronic device 700 (AdvA') while the advertising data generated by the electronic device 101 remains the same. Thus, the first advertising packet copied and transmitted by the second external electronic device 700 in operation 701 may include the address (AdvA') of the second external electronic device and the advertising data generated and transmitted from the electronic device 101.

According to an embodiment, the first external electronic device 750 may transmit a scan request to the second external electronic device 700 in operation 703. The first external electronic device 750 may determine whether to perform operations to establish a Bluetooth connection with the second external electronic device 700 based on the advertising data included in the received first advertising packet. Since the first external electronic device 750 uses the advertising data included in the advertising packet transmitted from the second external electronic device 700 to determine whether to perform the operations to establish the Bluetooth connection and the advertising data is a copy of the advertising data generated by the electronic device 101, the first external electronic device 750 may initially determine to perform the operations to establish Bluetooth connection with the second external electronic device 700 (i.e., prior to actually initiating the process of establishing the Bluetooth connection).

According to an embodiment, the second external electronic device 700 may copy the scan response from the electronic device 101 and transmit the scan response to the first external electronic device 750 in operation 705. The scan response may include the address of the device transmitting the scan response and the scan response data (ScanRspData). Thus, the scan response copied and transmitted by the second external electronic device 700 may include the address (AdvA') of the second external electronic device 700 and the scan response data (ScanRspData) transmitted from the electronic device 101. The scan response data (ScanRspData) transmitted from the electronic device 101 may include the first encrypted random address resulting from encrypting the first random address (AdvA1) generated by the electronic device 101 and the second encrypted random address resulting from encrypting the second random address (AdvA2).

According to an embodiment, the first external electronic device 750 may identify whether the second external electronic device 700 is an authenticated device in operation 707. For example, the first external electronic device 750 may identify whether the second external electronic device 700 is an authenticated device based on the scan response. The scan response may include the address (AdvA') of the second external electronic device 700 and the first encrypted random address resulting from encrypting the first random address (AdvA1). In a case that the second external electronic device 700 is not an authenticated device (e.g., a shared key was not previously shared between the second external electronic device 700 and the first external electronic device) and is performing an MITM attack, the first external electronic device 750 may identify the result of encrypting the address (AdvA') of the second external electronic device 700 using a shared key previously shared with the electronic device 101 (e.g., an electronic device different from the device that directly transmitted the first advertising packet and/or the scan response to the first external electronic device 750). Since the first encrypted random address is a value resulting from encrypting the first random address (AdvA1), and the result of encrypting the address (AdvA') of the second external electronic device 700 is a value resulting from encrypting the address (AdvA') of the second external electronic device, the two values do not match each other and, thus, the first external electronic device 750 may identify that the second external electronic device 700 is not an authenticated device.

According to an embodiment, the second external electronic device 700 may transmit the second advertising packet which is a copy of the advertising packet transmitted from the electronic device 101 to the first external electronic device 750 in operation 709.

According to an embodiment, when the first external electronic device 750 determines that the second external electronic device 700 is not an authenticated device, the first external electronic device 750 may disregard the second advertising packet in operation 711. The first external electronic device 750 may previously receive and store the address of the electronic device with which a Bluetooth connection is to be established with (e.g., the electronic device 101 identified as an authenticated device) or may previously receive and store part of the address from which the address of the authenticated electronic device may be estimated. For example, the second external electronic device 700 may estimate the address of the electronic device 101 based on the first encrypted random address and the second encrypted random address included in the scan response data (ScanRspData) to generate an address that does not match an authenticated device address. In a case that the address (AdvA') of the second external electronic device 700 included in the second advertising packet does not match the address of an authenticated device previously identified and stored in the first external electronic device 750 to establish a Bluetooth connection, the first external electronic device 750 may disregard the second advertising packet received from the second external electronic device 700. Thus, although the second external electronic device 700 which does not previously share the shared key with the first external electronic device 750 copies and transmits the advertising packet and scan response packet of the electronic device 101 previously sharing the shared key, the first external electronic device 750 may not initiate establishing a Bluetooth connection with the second external electronic device 700.

Figure 8:
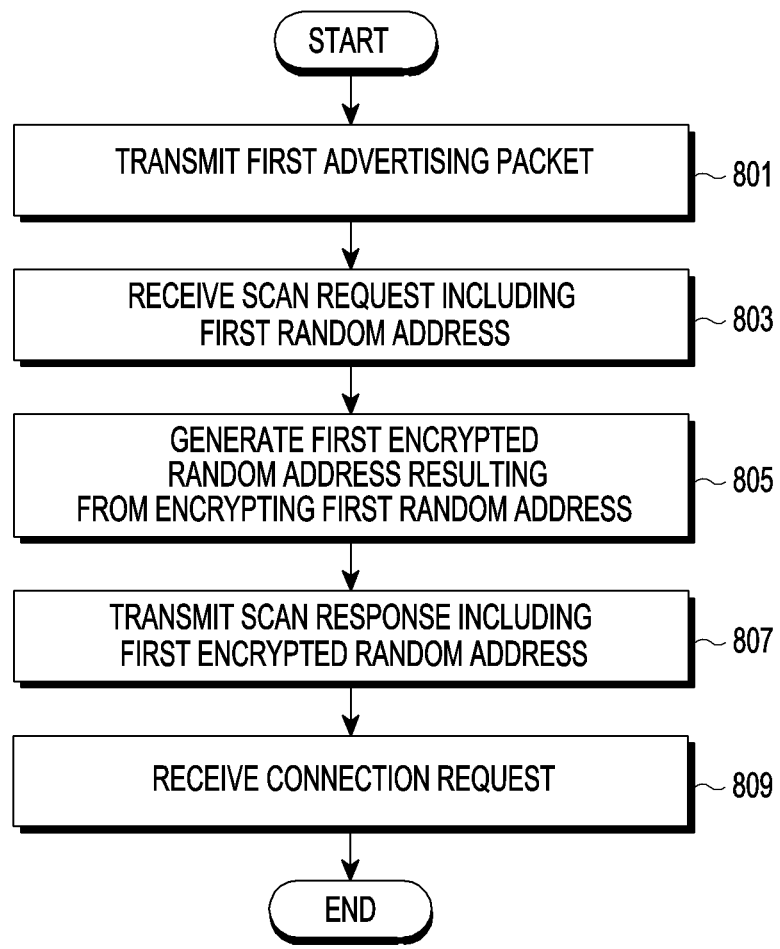
FIG. 8 is a flowchart illustrating a discovery method according to an embodiment of the disclosure.

FIG. 8 is a flowchart illustrating a discovery method according to an embodiment of the disclosure.

According to an embodiment, an electronic device 101 (e.g., the processor 120) may transmit a first advertising packet to a first external electronic device (e.g., the electronic device 102) in operation 801. The first advertising packet may include the address (AdvA) of the electronic device 101 and advertising data (AdvData) indicating a unique identifier for a service. The electronic device 101 may manage information included in the first advertising packet such that the information included in the first advertising packet (e.g., AdvA and AdvData) is valid from the time when the first advertising packet is generated until the time when a Bluetooth connection is established.

According to an embodiment, the electronic device 101 may receive, from the first external electronic device, a scan request including a first random address (ScanA1) in operation 803. The first random address (ScanA1) may be generated by the first external electronic device transmitting the scan request. Upon receiving the scan request, the electronic device 101 may identify that the address (first random address (ScanA1)) corresponds to the first external electronic device.

According to an embodiment, the electronic device 101 may generate a first encrypted random address resulting from encrypting the first random address (ScanA1) in operation 805. The electronic device 101 may store a shared key previously shared with the first external electronic device and encrypt the first random address (ScanA1) included in the scan request using the shared key, thereby generating the first encrypted random address. In an exemplary embodiment, when the first random address (ScanA1) is 6 octets long, the electronic device 101 may generate the first encrypted random address by encrypting the whole 6-octet first random address (ScanA1) or by encrypting only a portion (e.g., 3 octets) of the first random address (ScanA1).

According to an embodiment, the electronic device 101 may transmit a scan response including the first encrypted random address to the first external electronic device in operation 807. The header of the scan response may include the first random address (ScanA1) which is the address of the first external electronic device. The payload of the scan response may include the address (AdvA) of the electronic device 101 and information to be transmitted to the first external electronic device. For example, the electronic device 101 may generate response data (ScanRepData) including the generated first encrypted random address.

According to an embodiment, the electronic device 101 may receive a connection request from the first external electronic device in operation 809. For example, in a case that the electronic device 101 is identified to be an authenticated device by the first external electronic device, the electronic device 101 may receive the connection request from the first external electronic device, to initiate establishing a Bluetooth connection.

Figure 9:
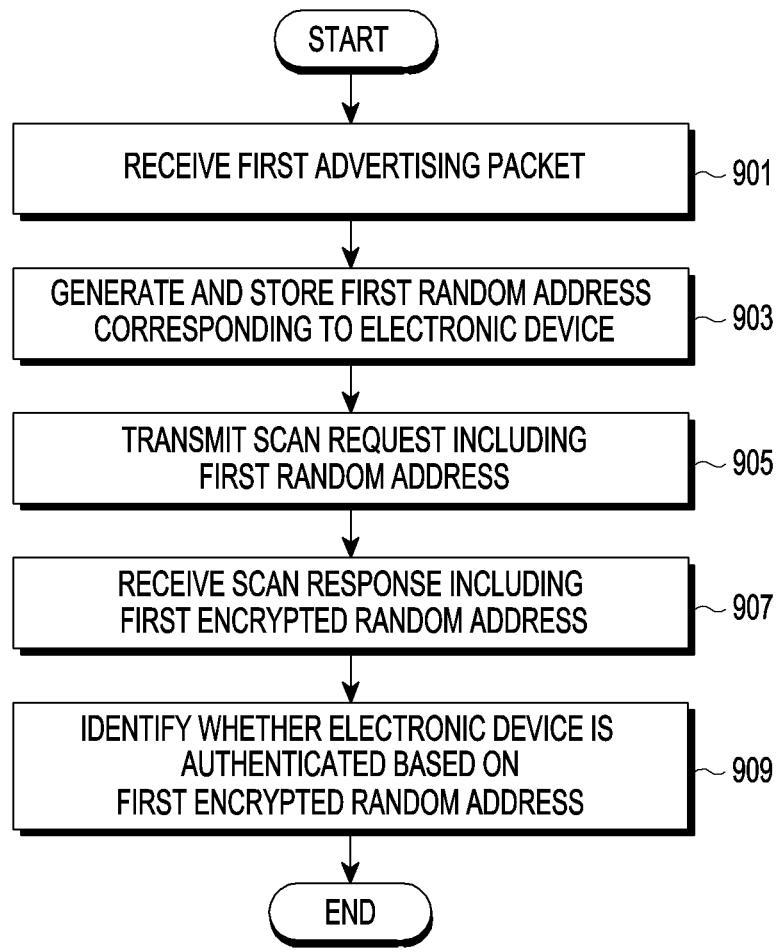
FIG. 9 is a flowchart illustrating a discovery method according to an embodiment of the disclosure.
Figure 10:
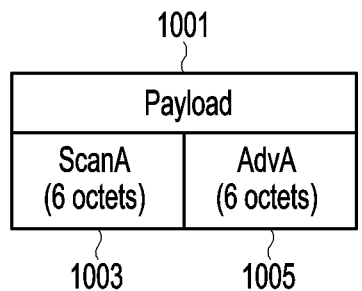
FIG. 10 illustrates a scan request packet according to an embodiment of the disclosure.

FIG. 9 is a flowchart illustrating a discovery method according to an embodiment of the disclosure. FIG. 10 is a view illustrating a scan request packet according to an embodiment of the disclosure. An embodiment is described in detail with reference to FIGS. 9 and 10.

Referring to FIG. 9, a first electronic device (e.g., the electronic device 102) may receive a first advertising packet from the electronic device 101 in operation 901. The first advertising packet may include the address (AdvA) of the device (e.g., the electronic device 101) transmitting the first advertising packet and advertising data (AdvData) indicating a unique identifier for a service.

According to an embodiment, the first external electronic device may generate and store a first random address corresponding to the electronic device 101 in operation 903. The first external electronic device may generate the first random address (ScanA1) corresponding to the electronic device 101 based on the first advertising packet.

For example, the first external electronic device may generate a random number, such as a one-time password (OTP), and represent the random number in the format of a scan address to thereby generate a random address. The first external electronic device may generate a random address as per the standards (e.g., Bluetooth core specification v5.0). The first external electronic device may generate a random address indicating the address (ScanA) of the first external electronic device whenever receiving an advertising packet from different devices. For example, upon receiving a second advertising packet from the second external electronic device, the first external electronic device may generate a second random address (ScanA2) corresponding to the second external electronic device. The first external electronic device may generate a table with each of the devices having transmitted the advertising packets matching a respective one of the random addresses of the devices and may store the generated table in the memory.

According to an embodiment, the first external electronic device may transmit a scan request including the first random address to the electronic device 101 in operation 905. For example, as shown in FIG. 10, the first external electronic device may allocate 6 octets of the payload 1001 of the scan request to represent the address (ScanA) 1003 of the first external electronic device and allocate 0-6 octets of the payload 1001 of the scan request to represent the address (AdvA) 1005 of the electronic device 101. For example, the address (ScanA) of the first external electronic device may be a first random address (ScanA1) randomly generated.

According to an embodiment, the first external electronic device may receive, from the electronic device 101, a scan response including the first encrypted random address in operation 907. The first encrypted random address may be a value resulting from encrypting the first random address (ScanA1) in the electronic device 101 having transmitted the scan response. Since the first external electronic device has transmitted the first random address (ScanA1) targeting the electronic device 101, the first external electronic device may determine whether the scan response received using the first random address (ScanA1) and the first encrypted random address is one transmitted by the electronic device 101 or one copied by malicious user device (e.g., a second external electronic device performing a MITM attack).

According to an embodiment, the first external electronic device may identify whether the electronic device 101 is authenticated based on the first encrypted random address in operation 909. The first external electronic device may store a shared key previously shared with the electronic device 101 and generate the second encrypted random address by encrypting the first random address (ScanA1) stored in operation 903 using the shared key. If the generated second encrypted random address matches the first encrypted random address included in the scan response, the first external electronic device may determine that the electronic device 101 is an authenticated device. If the electronic device 101 is identified to be an authenticated device, the first external electronic device may transmit a connection request to the electronic device 101, for establishing a Bluetooth connection.

Figure 11:
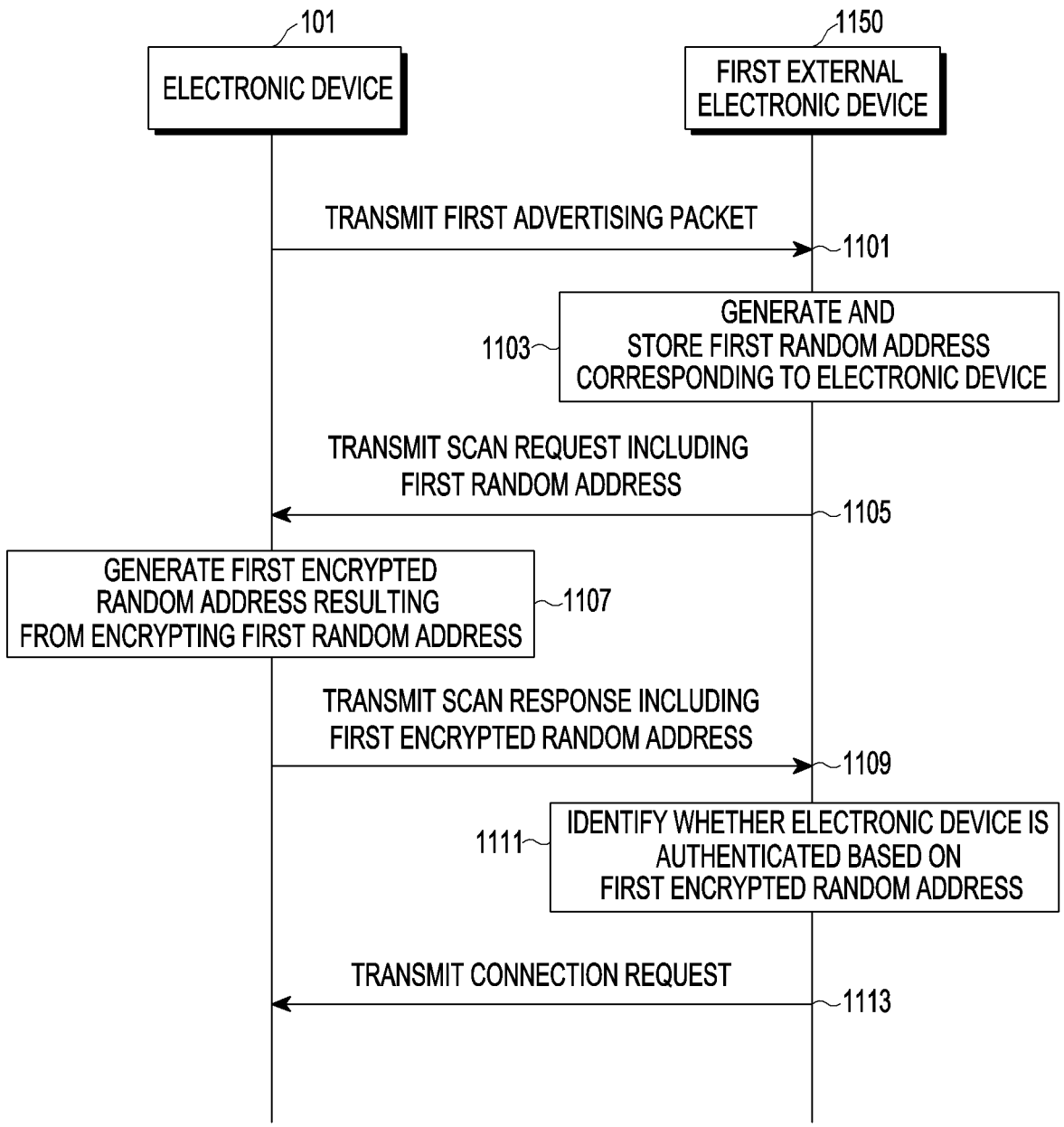
FIG. 11 is a flowchart illustrating a discovery method according to an embodiment of the disclosure.

FIG. 11 is a flowchart illustrating a discovery method according to an embodiment of the disclosure. According to an embodiment, FIG. 11 assumes that an electronic device 101 and a first external electronic device 1150 store a shared key previously shared therebetween.

According to an embodiment, an electronic device 101 (e.g., the processor 120) may transmit a first advertising packet to a first external electronic device 1150 (e.g., the electronic device 102) in operation 1101. The first advertising packet may include the address (AdvA) of the electronic device 101 and advertising data indicating a unique identifier for a service.

According to an embodiment, the first external electronic device 1150 may generate and store a first random address corresponding to the electronic device 101 in operation 1103. The first external electronic device 1150 may generate the first random address (ScanA1) corresponding to the electronic device 101 having transmitted the first advertising packet. The first external electronic device 1150 may generate a random address indicating the address (ScanA) of the first external electronic device whenever receiving an advertising packet from different devices.

According to an embodiment, the first external electronic device 1150 may transmit a scan request including a first random address (ScanA1) in operation 1105. The scan request may further include the address (AdvA) of the electronic device 101.

According to an embodiment, the electronic device 101 may generate a first encrypted random address resulting from encrypting the first random address (ScanA1) in operation 1107. The electronic device 101 may encrypt the first random address (ScanA1) included in the received scan request using a shared key previously shared with the first external electronic device 1150, thereby generating the first encrypted random address.

According to an embodiment, the electronic device 101 may transmit a scan response including the first encrypted random address to the first external electronic device 1150 in operation 1109. The header of the scan response may include the first random address (ScanA1) which is the address of the first external electronic device 1150. The payload of the scan response may include the address (AdvA) of the electronic device 101 and scan response data (ScanRspData) indicating information to be transmitted to the first external electronic device. For example, the electronic device 101 may transmit a scan response including the response data (ScanRepData) including the generated first encrypted random address.

According to an embodiment, the first external electronic device 1150 may identify whether the electronic device 101 is an authenticated device based on the first encrypted random address in operation 1111. The first external electronic device 1150 may determine whether the address (AdvA) of the electronic device included in the scan request transmitted in operation 1105 matches the address (AdvA) of the electronic device 101 included in the scan response. The first external electronic device 1150 may determine whether the first random address (AdvA1) included in the header of the received scan response is identical to the first random address (ScanA1) stored in operation 1103. Since a target device for transmission of a scan request differs, the first external electronic device 1150 generates and transmits a different random address, the address (AdvA) of the electronic device included in the scan request being identical to the address (AdvA) of the electronic device included in the scan response and the first random address (ScanA1) included in the header of the scan response being identical to the first random address (ScanA1) stored in operation 1103 may mean that the electronic device 101 receiving the scan request is the same device as the electronic device 101 having transmitted the scan response. Upon determining that the electronic device 101 receiving the scan request is the same device as the electronic device 101 having transmitted the scan response, the first external electronic device 1150 may encrypt the first random address (ScanA1) stored in operation 1103 using the shared key previously shared with the electronic device 101, thereby generating the second encrypted random address. If the generated second encrypted random address matches the first encrypted random address included in the scan response, the first external electronic device may determine that the electronic device 101 is an authenticated device.

According to an embodiment, the first external electronic device 1150 may transmit a connection request to the electronic device 101 in operation 1113. If the electronic device 101 is identified to be an authenticated device, the first external electronic device may transmit a connection request to the electronic device 101, to initiate establishment of a Bluetooth connection.

Figure 12:
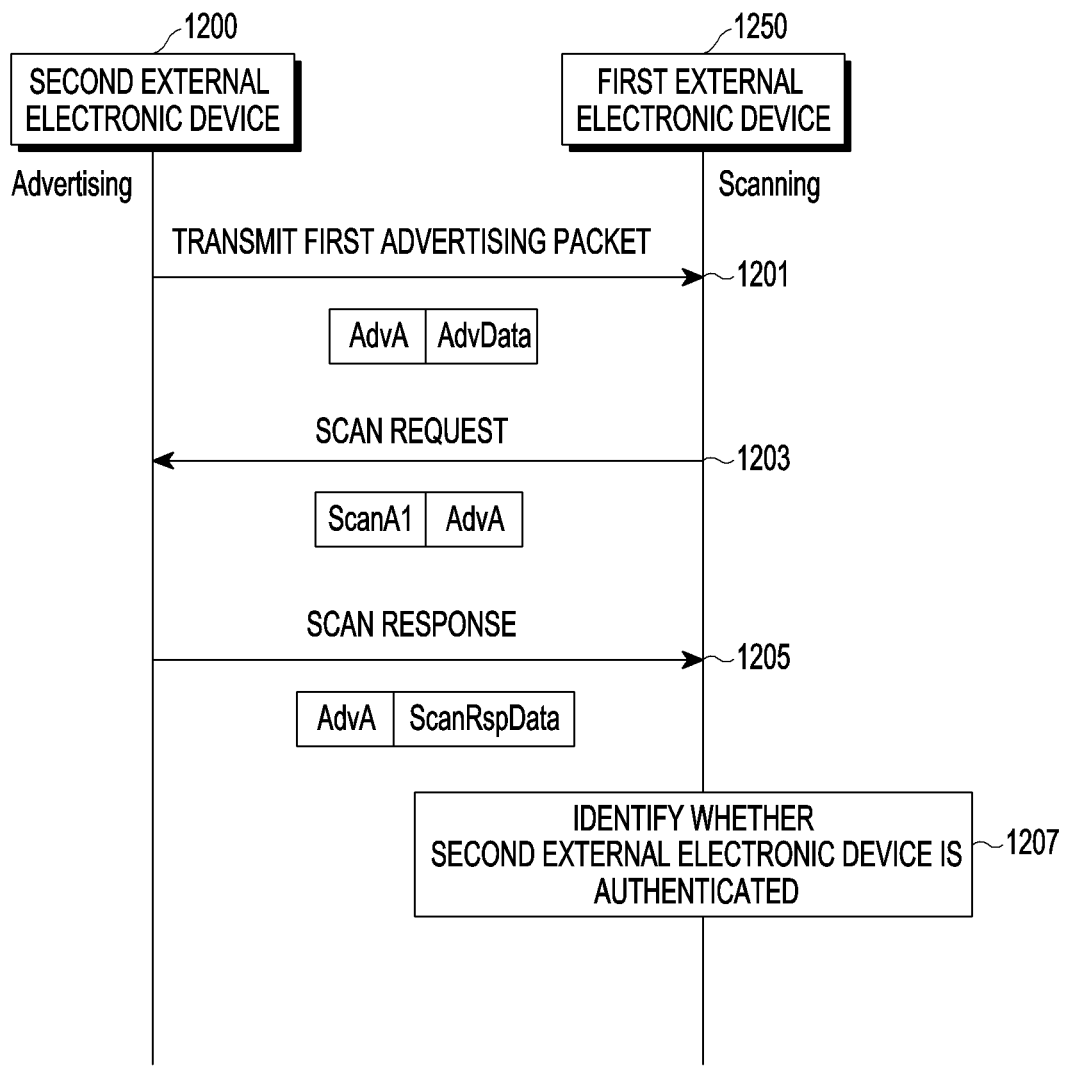
FIG. 12 is a flowchart illustrating a discovery method according to an embodiment of the disclosure.

FIG. 12 is a flowchart illustrating a discovery method according to an embodiment of the disclosure. According to an embodiment, FIG. 12 assumes that a second external electronic device 1200 and a first external electronic device 1250 do not store a shared key previously shared therebetween. The second external electronic device 1200 of FIG. 12 may be a malicious user device that copies and retransmits the data stream of the electronic device 101 (e.g., a device to execute a MITM attack).

According to an embodiment, the second external electronic device 1200 may transmit the first advertising packet which is a copy of the advertising packet transmitted from the electronic device 101 to the first external electronic device 1250 in operation 1201. The advertising packet may include the address of the device transmitting the advertising packet and the advertising data. Thus, the advertising packet copied and transmitted by the second external electronic device 1200 may include the address (AdvA') of the second external electronic device and the advertising data (AdvData) transmitted from the electronic device 101.

According to an embodiment, the first external electronic device 1250 may generate the random address (ScanA2) corresponding to the second external electronic device 1200 and transmit a scan request including the random address (ScanA2) to the second external electronic device 1200 in operation 1203. The first external electronic device 1250 may receive an advertising packet from the electronic device 101 and transmit a scan request including the random address (ScanA1) to the electronic device 101.

According to an embodiment, the second external electronic device 1200 may copy the scan response from the electronic device 101 and transmit the scan response to the first external electronic device 1250 in operation 1205. The header of the scan response may include the address of the device receiving the scan response, and the payload of the scan response may include the address of the device transmitting the scan response and the scan response data. Thus, the header of the scan response copied and transmitted by the second external electronic device 1200 may include the random address (ScanA2) received in operation 1203, and the payload of the scan response may include the address (AdvA') of the second external electronic device and the scan response data (ScanRspData) transmitted from the electronic device 101. The scan response data (ScanRspData) transmitted from the electronic device 101 may include the first encrypted random address resulting from encrypting the random address (ScanA1) received by the electronic device 101.

According to an embodiment, the first external electronic device 1250 may identify whether the second external electronic device 1200 is authenticated in operation 1207. The first external electronic device 1250 may encrypt the random address (ScanA2) included in the header of the scan response using the shared key previously shared with the electronic device 101, thereby generating the second encrypted random address. If the generated second encrypted random address does not match the first encrypted random address included in the scan response data (ScanRspData), the first external electronic device 1250 may determine that the second external electronic device 1200 is not an authenticated device. Thus, although the second external electronic device 1200 copies and transmits the random address encrypted with the shared key between the electronic device 101 and the first external electronic device 1250, the first external electronic device 1250 may determine that the second external electronic device 1200 is not an authenticated device.

In another embodiment, when the second external electronic device 1200 is identified as being an authenticated device, the first external electronic device 1250 may transmit a connection request in operation 1209. For example, upon determining that the second external electronic device 1200 is an authenticated device, the first external electronic device 1250 may transmit the connection request to initiate the establishment of a Bluetooth connection with the second external electronic device 1200.

Figure 13:
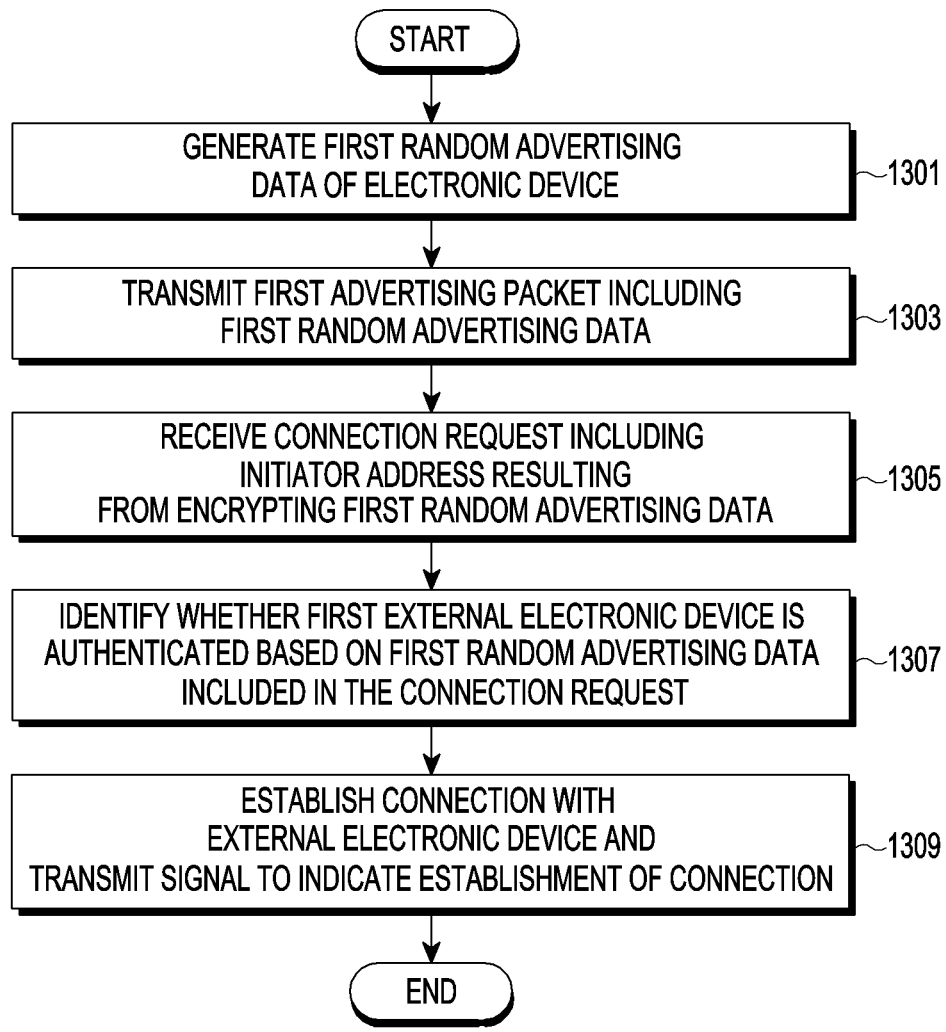
FIG. 13 is a flowchart illustrating a discovery method according to an embodiment of the disclosure.

FIG. 13 is a flowchart illustrating a discovery method according to an embodiment of the disclosure. FIG. 14 illustrates an advertising data packet according to an embodiment of the disclosure. The embodiment related to FIG. 13 is described in greater detail with reference to FIG. 14.

Referring to FIG. 13, an electronic device 101 (e.g., the processor 120) may generate first random advertising data (AdvData1) of the electronic device 101 in operation 1301. For example, the electronic device 101 may generate a random number whenever transmitting an advertising packet and set the same as part of advertising data, thereby generating the first random advertising data (AdvData1). For example, as illustrated in FIG. 14, if 28 bytes of the advertising data to which 31 bytes have been allocated are data set by the user, the electronic device 101 may generate and set a random number to 3 bytes which have no data set by the user of the advertising data whenever transmitting an advertising packet. The information included in the first advertising packet may be valid from the time when the first advertising packet including the first random advertising data (AdvData1) is generated until the time when a Bluetooth connection is established.

Referring back to FIG. 13, according to an embodiment, the electronic device 101 may transmit a first advertising packet including the first random advertising data (AdvData1) to the first external electronic device (e.g., the electronic device 102) in operation 1303. For example, when the first random advertising data (AdvData1) is generated in operation 1301, the electronic device 101 may transmit a first advertising packet including the address (AdvA) of the electronic device and the first random advertising data (AdvData1).

According to an embodiment, the electronic device 101 may receive a connection request including an initiator address (InitA) resulting from encrypting the first random advertising data (AdvData1) in operation 1305. For example, if the first random advertising data (AdvData1) is generated in operation 1301, the electronic device 101 may receive, from the first external electronic device, a connection request including an initiator address (InitA) generated by encrypting the first random advertising data (AdvData1).

According to an embodiment, the electronic device 101 may identify whether the first external electronic device is authenticated based on at least one portion of the first random advertising data (AdvData1) included in the connection request in operation 1307. For example, if the first random advertising data (AdvData1) is generated in operation 1301, the electronic device 101 may encrypt the first random advertising data (AdvData1) using a shared key previously shared with the first external electronic device, thereby generating the first encrypted random advertising data. If the generated first encrypted random advertising data matches the received initiator address (InitA), the electronic device 101 may identify that the first external electronic device is an authenticated device. According to an embodiment, the electronic device 101 may establish a connection with the first external electronic device and transmit a signal to indicate the establishment of the connection in operation 1309. If the first external electronic device is identified to be an authenticated device, the electronic device 101 may transmit a signal (e.g., connection data protocol data unit (PDU)) to indicate the generation of connection, thereby establishing a Bluetooth connection.

Figure 15:
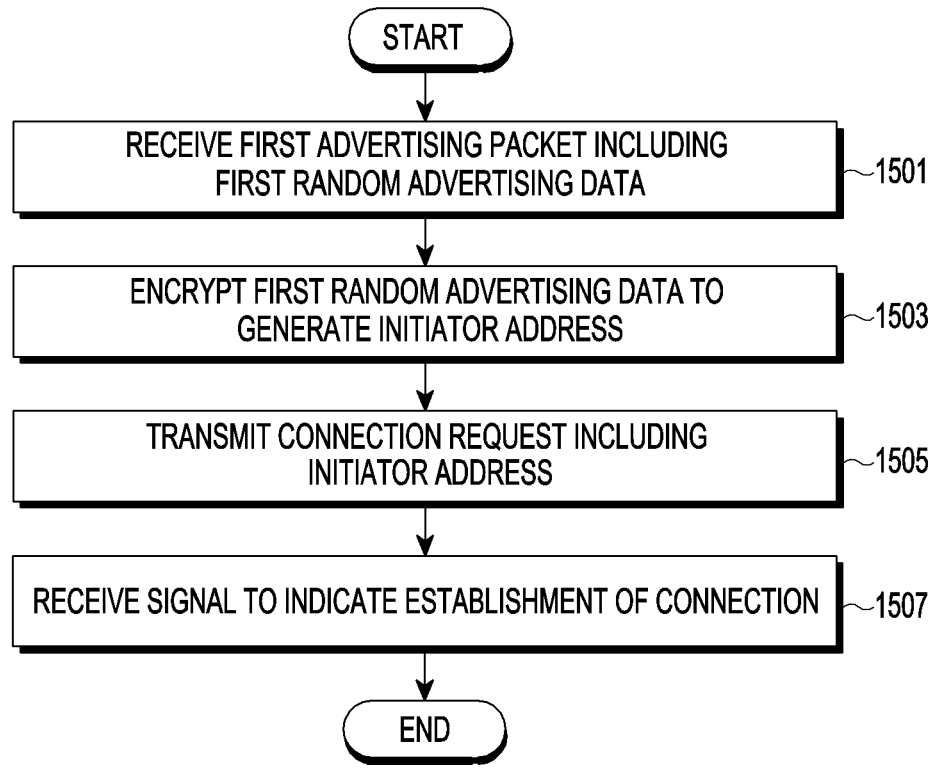
FIG. 15 is a flowchart illustrating a discovery method according to an embodiment of the disclosure.
Figure 16A:
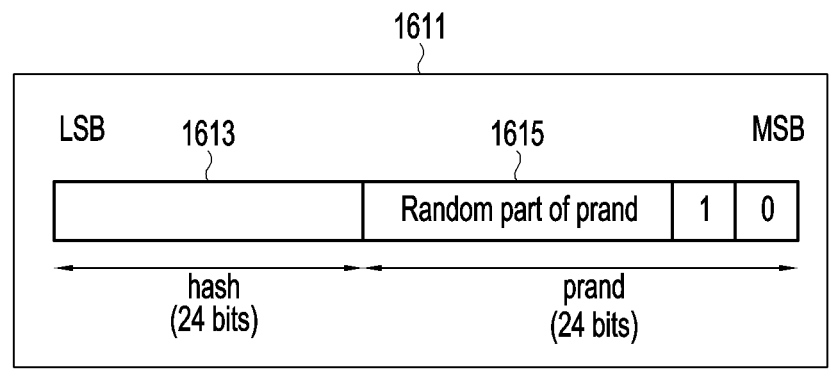
FIGS. 16A and 16B illustrate connection indicator packets according to various embodiments of the disclosure.
Figure 16B:
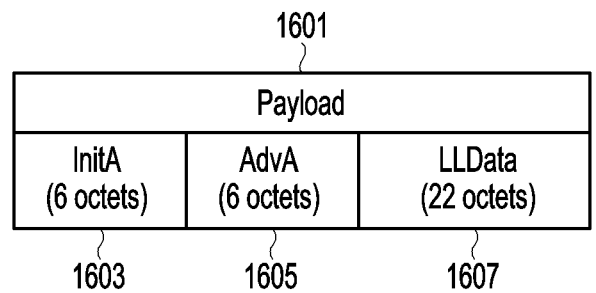

FIG. 15 is a flowchart illustrating a discovery method according to an embodiment of the disclosure. FIGS. 16A and 16B illustrate connection indicator packets according to various embodiments of the disclosure. The embodiment of FIG. 15 is described in further detail with reference to FIGS. 16A and 16B.

Referring to FIG. 15, a first external electronic device (e.g., the electronic device 102) may receive a first advertising packet including first random advertising data (AdvData1) in operation 1501. For example, the first external electronic device may receive the first advertising packet including the first random advertising data. As another example, the first external electronic device may receive the first advertising packet including the address (AdvA) of the electronic device 101 and the first random advertising data (AdvData1).

According to an embodiment, the first external electronic device may encrypt the first random advertising data to thereby generate an initiator address (InitA) in operation 1503. For example, upon receiving the first advertising packet including the first random advertising data (AdvData1) and the address (AdvA) of the electronic device 101 in operation 1501, the first external electronic device may encrypt the first random advertising data (AdvData1) using the shared key previously shared with the electronic device 101, thereby generating the initiator address (InitA). For example, the initiator address (InitA) 1611 may be a Bluetooth private address packet format defined in the standard (e.g., Bluetooth core specification v5.0) as shown in FIG. 16A. The Bluetooth private address packet format may be 48-bit long. For example, of the 48-bit Bluetooth private address packet format, the 24-bit most significant bit (MSB) 1615 may be a random number (24 bit random part), and the 24-bit least significant bit (LSB) 1613 may be a hash value generated with a shared key and a random number.

Referring back to FIG. 15, according to an embodiment, the first external electronic device may send a connection request including the initiator address (InitA) in operation 1505. For example, the connection request including the initiator address (InitA) may be a connect indication signal. Of the payload 1601 of the connect indication signal, 6 octets may be allocated to represent the initiator address (InitA) 1603, 6 octets may be allocated to represent the address (AdvA) 1605 of the electronic device 101, and 22 octets may be allocated to represent data (LLData) 1607 necessary for link connection as shown in FIG. 16B.

Referring back to FIG. 15, according to an embodiment, the first external electronic device may receive a signal to indicate the establishment of the connection in operation 1507. If the first external electronic device is identified to be an authenticated device by the electronic device 101 receiving the connection request, the first external electronic device may receive the signal (e.g., connection data PDU) to indicate the establishment of connection, thereby forming a Bluetooth connection.

Figure 17:
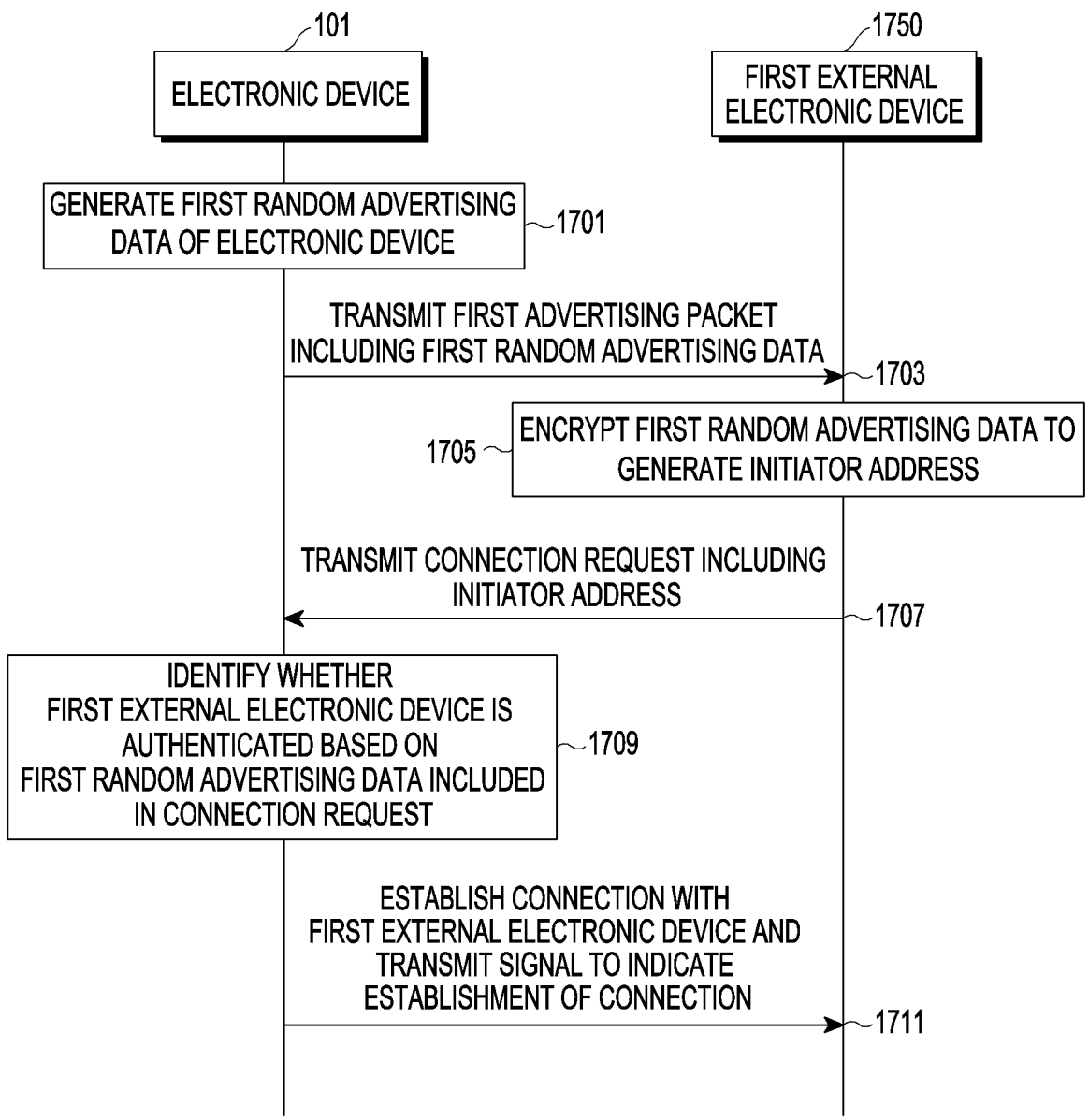
FIG. 17 is a flowchart illustrating a discovery method according to an embodiment of the disclosure.

FIG. 17 is a flowchart illustrating a discovery method according to an embodiment of the disclosure. According to an embodiment, the embodiment of FIG. 17 assumes that an electronic device 101 and a first external electronic device 1750 store a shared key previously shared therebetween.

Referring to FIG. 17, an electronic device 101 (e.g., the processor 120) may generate first random advertising data (AdvData1) of the electronic device 101 in operation 1701. For example, the electronic device 101 may set data, which is not set by the user among the pieces of advertising data, as a random number, thereby generating first random advertising data.

According to an embodiment, the electronic device 101 may transmit a first advertising packet including the first random advertising data (AdvData1) in operation 1703. For example, when the first random advertising data (AdvData1) is generated in operation 1701, the electronic device 101 may transmit, to the first external electronic device 1750, a first advertising packet including the address (AdvA) of the electronic device and the first random advertising data (AdvData1).

According to an embodiment, the first external electronic device 1750 (e.g., the electronic device 102) may encrypt the first random advertising data to thereby generate an initiator address (InitA) in operation 1705. For example, upon receiving the first advertising packet including the first random advertising data (AdvData1) and the address (AdvA) of the electronic device 101, the first external electronic device 1750 may encrypt the first random advertising data (AdvData1) using the shared key previously shared with the electronic device 101, thereby generating the initiator address (InitA). According to an embodiment, the first external electronic device 1750 may transmit a connection request including the initiator address (InitA) in operation 1707. For example, the connection request including the initiator address may be a connect indication signal.

According to an embodiment, the electronic device 101 may identify whether the first external electronic device 1750 is authenticated based on the first random advertising data (AdvData1) included in the connection request in operation 1709. For example, if the first random advertising data (AdvData1) is generated in operation 1701, the electronic device 101 may encrypt the first random advertising data (AdvData1) using a shared key previously shared with the first external electronic device 1750, thereby generating the first encrypted random advertising data. If the generated first encrypted random advertising data matches the received initiator address (InitA), the electronic device 101 may identify that the first external electronic device 1750 is an authenticated device.

According to an embodiment, the electronic device 101 may establish a connection with the first external electronic device 1750 and transmit a signal to indicate the establishment of the connection in operation 1711. If the first external electronic device is identified to be an authenticated device, the electronic device 101 may transmit a signal (e.g., connection data protocol data unit (PDU)) to indicate the establishment of connection, thereby forming a Bluetooth connection. Thus, the electronic device 101 may determine whether the first external electronic device 1750 is an authenticated device and, only when the first external electronic device 1750 is an authenticated device, the electronic device 101 may form a Bluetooth connection with the first external electronic device 1750.

Figure 18:
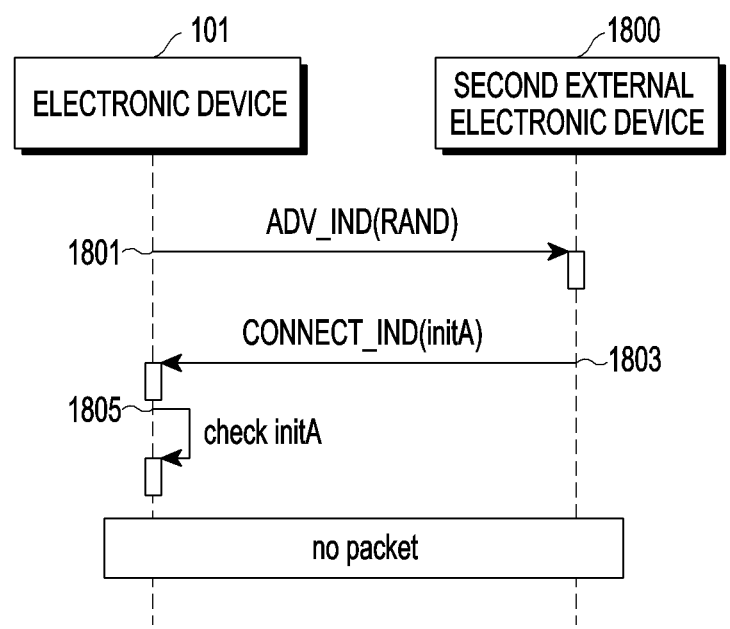
FIG. 18 is a flowchart illustrating a discovery method according to an embodiment of the disclosure.

FIG. 18 is a flowchart illustrating a discovery method according to an embodiment according to an embodiment of the disclosure.

According to an embodiment, the embodiment of FIG. 18 assumes that a second external electronic device 1800 does not store a shared key previously shared with the electronic device 101. The second external electronic device 1800 of FIG. 18 may be a malicious user device that copies and retransmits the data stream of the first external electronic device (e.g., the first external electronic device 1750 of FIG. 17) storing the shared key previously shared with the electronic device 101 (e.g., a device that executes a MITM attack).

According to an embodiment, the electronic device 101 (e.g., the processor 120) may transmit an advertising packet (ADV_IND(RAND2)) including a second random number in operation 1801. The electronic device 101 may generate a random number whenever transmitting an advertising packet, and a plurality of devices receiving advertising packets may receive advertising packets including different random numbers. For example, the electronic device 101 may transmit an advertising packet (ADV_IND(RAND1)) including a first random number to the first external electronic device (e.g., the electronic device 102). The first external electronic device may be a device storing a shared key previously shared with the electronic device 101.

According to an embodiment, the second external electronic device 1800 may copy the connection request (CONNECT_IND(initA1)) transmitted from the first external electronic device to the electronic device 101 and transmit the copy to the electronic device 101 in operation 1803. Since the first external electronic device has received the advertising packet (ADV_IND(RAND1)) including the first random number from the electronic device 101, the connection request (CONNECT_IND(initA1)) transmitted from the first external electronic device may include the initiator address (InitA) resulting from encrypting the first random number.

According to an embodiment, the electronic device 101 may identify whether the second external electronic device 1800 is authenticated using the received connection request (CONNECT_IND(initA1)) in operation 1805. The electronic device 101 may encrypt the second random number included in the second advertising packet (ADV_IND(RAND2)) transmitted to the second external electronic device 1800 using the shared key previously shared with the first external electronic device, thereby generating the second encrypted random number. If the second encrypted random number does not match the initiator address (InitA) included in the connection request (CONNECT_IND(initA1)), the electronic device 101 may identify that the second external electronic device 1800 is not an authenticated device. Thus, although the second external electronic device 1800 copies and transmits the connection request (CONNECT_IND(initA1)) received from the first external electronic device (i.e., the authenticated device), the electronic device 101 may not establish a Bluetooth connection with the second external electronic device 1800.

According to an embodiment, an electronic device 101 comprises a wireless communication circuit (e.g., the wireless communication module 192) configured to transmit/receive at least one radio frequency (RF) signal, at least one processor (e.g., the processor 120) operatively connected with the wireless communication circuit (e.g., the wireless communication module 192), and a memory (e.g., the memory 130) operatively connected with the at least one processor (e.g., the processor 120), wherein the memory (e.g., the memory 130) includes instructions that, when executed, enable the processor (e.g., the processor 120) to generate a first random address of the electronic device 101, transmit a first advertising packet including the first random address via the wireless communication circuit (e.g., the wireless communication module 192), receive a scan request corresponding to the first advertising packet via the wireless communication circuit (e.g., the wireless communication module 192) from an external electronic device (e.g., the electronic device 102), generate a first encrypted random address resulting from encrypting the first random address and a second encrypted random address resulting from encrypting the second random address, corresponding to reception of the scan request, transmit a scan response including the first encrypted random address and the second encrypted random address to the external electronic device (e.g., the electronic device 102) via the wireless communication circuit (e.g., the wireless communication module 192), and transmit a second advertising packet including the second random address via the wireless communication circuit (e.g., the wireless communication module 192).

According to an embodiment, the instructions may enable the processor (e.g., the processor 120) to generate a random address whenever transmitting an advertising packet.

According to an embodiment, the first random address may be valid from a time when the first random address is generated to a time when the second advertising packet including the second random address is transmitted.

According to an embodiment, the memory (e.g., the memory 130) may store a shared key corresponding to the external electronic device (e.g., the electronic device 102). The instructions may enable the processor (e.g., the processor 120) to generate the first encrypted random address using the first random address and the shared key.

According to an embodiment, the instructions may enable the processor (e.g., the processor 120) to receive, from the external electronic device (e.g., the electronic device 102), a connection request corresponding to the second advertising packet and establish a Bluetooth connection with the external electronic device (e.g., the electronic device 102) based on reception of the connection request.

According to an embodiment, in response to the electronic device being identified as an authenticated electronic device, the connection request may be received from the external electronic device.

According to an embodiment, when the first encrypted random address matches the second encrypted random address, the electronic device 101 may be identified to be the authenticated device by the external electronic device 102.

According to an embodiment, an electronic device 101 comprises a wireless communication circuit (e.g., the wireless communication module 192) configured to transmit/receive at least one radio frequency (RF) signal, at least one processor (e.g., the processor 120) operatively connected with the wireless communication circuit (e.g., the wireless communication module 192), and a memory (e.g., the memory 130) operatively connected with the at least one processor (e.g., the processor 120), wherein the memory (e.g., the memory 130) includes instructions that, when executed, enable the processor (e.g., the processor 120) to generate a first random address of the electronic device, transmit a first advertising packet via the wireless communication circuit (e.g., the wireless communication module 192), receive a scan request corresponding to a first random address corresponding to the electronic device via the wireless communication circuit (e.g., the wireless communication module 192) from an external electronic device (e.g., the electronic device 102), generate a first encrypted random address resulting from encrypting the first random address, corresponding to reception of the scan request, transmit a scan response including the first encrypted random address to the external electronic device (e.g., the electronic device 102) via the wireless communication circuit (e.g., the wireless communication module 192), and receive a connection request from the external electronic device (e.g., the electronic device 102) via the wireless communication circuit (e.g., the wireless communication module 192).

According to an embodiment, the memory (e.g., the memory 130) may store a shared key corresponding to the external electronic device (e.g., the electronic device 102). The instructions may enable the processor (e.g., the processor 120) to generate the first encrypted random address using the first random address and the shared key.

According to an embodiment, the instructions may enable the processor (e.g., the processor 120) to establish a Bluetooth connection with the external electronic device (e.g., the electronic device 102) based on reception of the connection request.

According to an embodiment, the first random address may be randomly generated to correspond to the electronic device.

According to an embodiment, the electronic device may receive the connection request from the external electronic device (e.g., the electronic device 102) based on being identified as an authenticated electronic device by the external electronic device (e.g., the electronic device 102).

According to an embodiment, the electronic device may be identified as the authenticated electronic device by the external electronic device based on the first encrypted random address included in the scan response matching a value resulting from encrypting the first random address stored in the external electronic device.

According to an embodiment, the electronic device may be identified as an authenticated electronic device by the external electronic device (e.g., the electronic device 102) based on the first encrypted random address included in the scan request matching a value resulting from encrypting with a shared key stored in the external electronic device (e.g., the electronic device 102).

According to an embodiment, an electronic device comprises a wireless communication circuit (e.g., the wireless communication module 192) configured to transmit/receive at least one radio frequency (RF) signal, at least one processor (e.g., the processor 120) operatively connected with the wireless communication circuit (e.g., the wireless communication module 192), and a memory (e.g., the memory 130) operatively connected with the at least one processor (e.g., the processor 120), wherein the memory (e.g., the memory 130) includes instructions that, when executed, enable the processor (e.g., the processor 120) to generate first random advertising data based on a random number, transmit a first advertising packet including the first random advertising data via the wireless communication circuit (e.g., the wireless communication module 192), receive a connection request including an initiator address corresponding to the first advertising packet from an external electronic device (e.g., the electronic device 102) from the wireless communication circuit (e.g., the wireless communication module 192), identify whether the external electronic device (e.g., the electronic device 102) is authenticated based on the first random advertising data included in the connection request, and when the external electronic device (e.g., the electronic device 102) is identified to be authenticated, establish a connection with the external electronic device (e.g., the electronic device 102).

According to an embodiment, the instructions may enable the processor (e.g., the processor 120) to generate a random address or random advertising data whenever an advertising packet is transmitted.

According to an embodiment, the instructions may enable the processor (e.g., the processor 120) to first generate the first random advertising data and, when a condition of failing to generate the first random advertising data, generate the first random address.

According to an embodiment, the instructions may enable the processor (e.g., the processor 120) to, corresponding to transmission of the first advertising packet to the external electronic device (e.g., the electronic device 102), generate the initiator address by encrypting one of the first random advertising data or the first random address using one of the first random address or the first random advertising data and a shared key corresponding to the electronic device.

According to an embodiment, the memory (e.g., the memory 130) may store a shared key corresponding to the external electronic device (e.g., the electronic device 102), and wherein the instructions enable the processor (e.g., the processor 120) to, based on reception of the connection request, identify whether the external electronic device (e.g., the electronic device 102) is authenticated based on the shared key and the first random advertising data included in the connection request.

According to an embodiment, the instructions, when executed, may enable the processor (e.g., the processor 120) to encrypt the first random advertising data using the shared key and, if the encrypted value matches the initiator address, identify that the external electronic device (e.g., the electronic device 102) is an authenticated device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, an electronic device may be protected from attacks by malicious user devices while performing communication connection with an external electronic device and may be given enhanced security for communication connection by inter-device authentication.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a wireless communication circuit configured to transmit or receive at least one radio frequency (RF) signal;
at least one processor operatively connected with the wireless communication circuit; and
a memory operatively connected with the at least one processor,
wherein the memory includes instructions that, when executed, enable the at least one processor to:
generate a first random address of the electronic device,
transmit, via the wireless communication circuit, a first advertising packet including the first random address,
receive, from an external electronic device via the wireless communication circuit, a scan request corresponding to the first advertising packet,
generate a first encrypted random address resulting from encrypting the first random address and a second encrypted random address resulting from encrypting the second random address corresponding to reception of the scan request,
transmit, to the external electronic device via the wireless communication circuit, a scan response including the first encrypted random address and the second encrypted random address, and
transmit, via the wireless communication circuit, a second advertising packet including the second random address.

2. The electronic device of claim 1, wherein the instructions enable the at least one processor to generate a random address whenever an advertising packet is transmitted.

3. The electronic device of claim 1, wherein the first random address is valid from a time when the first random address is generated to a time when the second advertising packet including the second random address is transmitted.

4. The electronic device of claim 1,
wherein a shared key corresponding to the external electronic device is stored in the memory, and
wherein the instructions, when executed, further enable the at least one processor to generate the first encrypted random address using the first random address and the shared key.

5. The electronic device of claim 4, wherein the external electronic device receives the shared key before receiving the first advertising packet.

6. The electronic device of claim 1, wherein the instructions, when executed, further enable the processor to:
receive, from the external electronic device, a connection request corresponding to the second advertising packet, and
establish a Bluetooth connection with the external electronic device based on reception of the connection request.

7. The electronic device of claim 6, wherein when the electronic device is identified as an authenticated electronic device, the instructions, when executed, further enable the processor to receive the connection request from the external electronic device.

8. The electronic device of claim 6, wherein the connection request is received from the external electronic device based on the first encrypted random address matching the second encrypted random address.

9. The electronic device of 5, wherein the connection request initiates the establishment of the Bluetooth connection between the electronic device and the external electronic device.

10. The electronic device of claim 1, wherein the external electronic device determines whether the electronic device is executing a man in the middle (MITM) attack based on the first advertising packet and the scan response.

11. An electronic device, comprising:
a wireless communication circuit configured to transmit or receive at least one radio frequency (RF) signal;
at least one processor operatively connected with the wireless communication circuit; and
a memory operatively connected with the at least one processor, wherein the memory includes instructions that, when executed, enable the at least one processor to:
generate a first random address of the electronic device,
transmit, via the wireless communication circuit, a first advertising packet,
receive, from an external electronic device via the wireless communication circuit, a scan request corresponding to a first random address corresponding to the electronic device,
generate a first encrypted random address resulting from encrypting the first random address, corresponding to reception of the scan request,
transmit, to the external electronic device via the wireless communication circuit, a scan response including the first encrypted random address, and
receive, from the external electronic device via the wireless communication circuit, a connection request.

12. The electronic device of claim 11,
wherein a shared key corresponding to the external electronic device is stored in the memory, and
wherein the instructions that, when executed, further enable the at least one processor to generate the first encrypted random address using the first random address and the shared key.

13. The electronic device of claim 11, wherein the instructions that, when executed, further enable the at least one processor to establish a Bluetooth connection with the external electronic device based on reception of the connection request.

14. The electronic device of claim 13, wherein the electronic device is identified as an authenticated electronic device by the external electronic device based on the first encrypted random address included in the scan request matching a value resulting from encrypting with a shared key stored in the external electronic device.

15. The electronic device of claim 11, wherein the first random address is randomly generated to correspond to the electronic device.

16. The electronic device of claim 15, wherein the electronic device receives the connection request from the external electronic device based on being identified as an authenticated electronic device by the external electronic device.

17. The electronic device of claim 16, wherein the electronic device is identified as the authenticated electronic device by the external electronic device based on the first encrypted random address included in the scan response matching a value resulting from encrypting the first random address stored in the external electronic device.

18. An electronic device, comprising:
a wireless communication circuit configured to transmit or receive at least one radio frequency (RF) signal;
at least one processor operatively connected with the wireless communication circuit; and
a memory operatively connected with the at least one processor,
wherein the memory includes instructions that, when executed, enable the at least one processor to:
generate first random advertising data based on a random number,
transmit a first advertising packet including the first random advertising data via the wireless communication circuit,
receive a connection request including an initiator address corresponding to the first advertising packet from an external electronic device from the wireless communication circuit,
identify whether the external electronic device is authenticated based on the first random advertising data included in the connection request, and
when the external electronic device is identified as an authenticated device, establish a connection with the external electronic device.

19. The electronic device of claim 18, wherein the instructions that, when executed, further enable the at least one processor to generate a random address or random advertising data whenever an advertising packet is transmitted.

20. The electronic device of claim 18, wherein the instructions that, when executed, further enable the at least one processor to:
generate the first random advertising data, and
when a condition of failing to generate the first random advertising data is met, generate the first random address.

21. The electronic device of claim 18, wherein the instructions that, when executed, further enable the at least one processor to, corresponding to transmission of the first advertising packet to the external electronic device, generate the initiator address by encrypting one of the first random advertising data or the first random address using one of the first random address or the first random advertising data and a shared key corresponding to the electronic device.

22. The electronic device of claim 21,
wherein a shared key corresponding to the external electronic device is stored in the memory, and
wherein the instructions that, when executed, further enable the at least one processor to, based on reception of the connection request, identify whether the external electronic device is authenticated based on the shared key and the first random advertising data included in the connection request.

23. The electronic device of claim 22, wherein the instructions that, when executed, further enable the at least one processor to:
encrypt at least one portion of the first random advertising data using the shared key, and
based on whether the encrypted value matches the initiator address, identify that the external electronic device is an authenticated electronic device.

* * * * *